United States Patent
Aizawa et al.

(10) Patent No.: US 11,377,531 B2
(45) Date of Patent: Jul. 5, 2022

(54) PREPREG AND FIBER REINFORCED COMPOSITE MATERIAL

(71) Applicant: TORAY INDUSTRIES, INC., Tokyo (JP)

(72) Inventors: Bon Aizawa, Iyo-gun (JP); Ryuichi Kitahara, Iyo-gun (JP); Takahiro Nishimura, Iyo-gun (JP); Shinji Kochi, Iyo-gun (JP); Naoya Takeda, Iyo-gun (JP)

(73) Assignee: TORAY INDUSTRIES, INC., Tokyo (JP)

( * ) Notice: Subject to any disclaimer, the term of this patent is extended or adjusted under 35 U.S.C. 154(b) by 92 days.

(21) Appl. No.: 16/646,898

(22) PCT Filed: Nov. 14, 2018

(86) PCT No.: PCT/JP2018/042163
§ 371 (c)(1),
(2) Date: Mar. 12, 2020

(87) PCT Pub. No.: WO2019/098243
PCT Pub. Date: May 23, 2019

(65) Prior Publication Data
US 2020/0299476 A1 Sep. 24, 2020

(30) Foreign Application Priority Data
Nov. 14, 2017 (JP) .............................. JP2017-218900

(51) Int. Cl.
*C08J 5/24* (2006.01)
*C08G 59/50* (2006.01)
*C08J 5/04* (2006.01)

(52) U.S. Cl.
CPC ............ *C08J 5/24* (2013.01); *C08G 59/5033* (2013.01); *C08J 5/042* (2013.01); *C08J 2363/00* (2013.01); *C08J 2371/00* (2013.01); *C08J 2377/00* (2013.01)

(58) Field of Classification Search
CPC ......... B29D 7/01; B29B 11/14; B29B 15/105; B29B 7/90; C09D 163/00; B29C 70/06; B29C 70/003; B29C 70/0035; B29C 70/025; B29K 2105/0872; B29K 2063/00; B29K 2307/04; Y10T 428/31511; Y10T 428/24994; Y10T 428/249944; Y10T 428/249945; Y10T 428/24995; Y10T 428/249952; Y10T 428/269; Y10T 428/254; Y10T 428/2918; D06M 15/55; D06M 2101/40; D06M 13/11; C08G 77/00; C08G 2205/02; C08G 2205/025; C08G 59/226; C08G 59/56; C08G 59/4246; C08G 59/54; C08G 59/44; C08G 59/4014; C08G 59/50; C08G 59/5033; C08G 59/245; C08G 73/0233; C08G 5/24; C08G 5/042; C08G 5/26; C08G 2363/00; C08G 2363/02; C08G 2363/04; C08G 2400/22; C08G 2377/02; C08L 2203/12; C08L 63/00; C08L 63/04; C08L 63/10; B32B 2260/046; B32B 2260/023; B32B 2260/02; B32B 2260/021; B32B 2260/025; B32B 2262/106; B32B 2264/0207; B32B 2264/108; B32B 2264/0264; B32B 27/38; B32B 27/26; B32B 27/08; B32B 5/26; B32B 5/026; B32B 5/30; B32B 5/22; B32B 5/16; B32B 2250/20
USPC ... 428/297.4, 413, 299.1, 220, 300.7, 301.4, 428/327; 523/427, 400, 500; 442/175
See application file for complete search history.

(56) References Cited

FOREIGN PATENT DOCUMENTS

JP 2014141656 * 8/2014

\* cited by examiner

*Primary Examiner* — Camie S Thompson
(74) *Attorney, Agent, or Firm* — Birch, Stewart, Kolasch & Birch LLP

(57) ABSTRACT

A prepreg contains components [A] to [E], wherein 85% by mass or more of the component [E] is present in a range within 9% of the average thickness of the prepreg from each surface of the prepreg, and a range within 7% of the average thickness of the prepreg from each surface of the prepreg is composed of a first resin composition containing components [B] to [E].

[A] a carbon fiber,
[B] an epoxy resin having two or more glycidyl groups in one molecule,
[C] an aromatic amine compound,
[D] a thermoplastic resin having a polyarylether skeleton, and
[E] particles having a number average primary particle size of 5 to 50 μm, having a content ratio (% by mass) of thermoplastic resin and thermosetting resin of 95:5 to 70:30.

13 Claims, No Drawings

PREPREG AND FIBER REINFORCED COMPOSITE MATERIAL

TECHNICAL FIELD

The present invention relates to a prepreg that can provide a fiber-reinforced composite material having both excellent impact resistance and chemical resistance, with very little generation of fuzz from a prepreg end and resin adhesion to a lay up device, in a lay up step using an automatic lay up device leading to production of a fiber-reinforced composite material.

BACKGROUND ART

Conventionally, fiber-reinforced composite materials made of reinforced fibers such as glass fibers, carbon fibers and aramid fibers, and cured products of thermosetting resins such as unsaturated polyester resins, vinyl ester resins, epoxy resins, phenol resins, cyanate ester resins and bismaleimide resins have excellent mechanical properties such as strength and elastic modulus, heat resistance, and corrosion resistance, while being lightweight, so that they have been applied in many fields such as aircraft members, spacecraft members, automobile members, ship members, civil engineering materials, and sports equipment. Especially in applications where high performance is required, fiber-reinforced composite materials using continuous fibers are used, carbon fibers with excellent specific strength and specific elastic modulus are much used as reinforced fibers, and an epoxy resin having high mechanical properties, heat resistance and high chemical resistance and excellent adhesion to carbon fibers are much used as a matrix resin.

A fiber-reinforced composite material is produced by various methods, and a method using a prepreg which is an intermediate base material in which reinforced fibers are impregnated with a matrix resin in advance is generally known.

A fiber-reinforced composite material using a thermosetting resin such as an epoxy resin as a matrix resin has a problem that impact resistance of the fiber-reinforced composite material is reduced because the fracture toughness of the cured product of the thermosetting resin is generally low. In particular, in the case of an aircraft structural member, improvement in impact resistance has been a major issue because it is required to have excellent impact resistance against dropping of tools during assembly, impacts from hail and birds during operation, and the like.

The fiber-reinforced composite material generally has a laminated structure, and when an impact is applied to the fiber-reinforced composite material, high stress is generated between layers, and a crack is generated. In order to improve the impact resistance of the fiber-reinforced composite material, it is effective to suppress propagation of cracks generated between the layers due to the impact, and various techniques have been proposed.

As one of them, as described in Patent Documents 1 and 2, a method of disposing a thermoplastic resin with excellent toughness near the surface of the prepreg, disposing the thermoplastic resin between the layers where cracking easily occurs due to lamination is known. However, with regard to the thermoplastic resins studied in the documents, for example, polyamides and polycarbonates have drawbacks such as weak in high temperature and high humidity and chemical resistance, and are not suitable for aircraft materials that require particularly high performance. Also, it is known that polyimides and polyamide-imides are relatively strong against high temperatures and high humidity and organic solvents, which are disadvantages of polyamides and the like, but have lower toughness than polyamides and are insufficient to improve the impact resistance of the fiber-reinforced composite material.

On the other hand, in recent years, particularly in the aircraft field, the application ratio of fiber-reinforced composite materials in aircraft has greatly increased in order to reduce the weight of the aircraft and improve fuel efficiency. For this reason, the application has been dramatically progressed from so-called hand lay-up method, that is conventional lay up of prepregs by human, to ATL (Auto Tape Layup) method and AFP (Auto Fiber Placement) method, using an automatic lay up device. When laying up prepregs by applying the automatic lay up device, prepregs processed into sheets or tapes run in the device, so that a part of the reinforced fibers or matrix resin adheres and deposits on a part where the prepregs come into contact, and the deposit again adheres to the prepreg and runs and is layed up, which is a defect that deteriorates properties of the obtained fiber-reinforced composite material. In addition, the deposit may clog the automatic lay up device and stop the operation. In this case, it is necessary to disassemble and clean the device, which causes a problem that the working time is significantly increased.

So far, for the purpose of improving fabricating workability by optimizing tackiness of the prepreg, as described in Patent Document 3, it has been mainly performed that the viscosity of the matrix resin is increased and adherence (tackiness) of the prepreg is decreased. However, in this case, it is known that adhesion between the prepregs is impaired and the lay up work is hindered.

For the reasons described above, in the case of producing a fiber-reinforced composite material having excellent impact resistance, particularly used in the aircraft field, by applying an automatic lay up device, it has been desired to develop a material that can be layed up without adhesion and deposition of a part of the reinforced fibers or matrix resin in the device.

PRIOR ART DOCUMENTS

Patent Documents

Patent Document 1: International Publication No. WO 96/17006
Patent Document 2: Japanese Patent No. 6052426
Patent Document 3: Japanese Patent No. 3539603

SUMMARY OF THE INVENTION

Problems to be Solved by the Invention

An object of the present invention is, in the case of producing a fiber-reinforced composite material having excellent impact resistance by using an automatic lay up device, to provide a prepreg that can be layed up without adhesion and deposition of a part of the reinforced fibers or matrix resin in the device.

Solutions to the Problems

The present invention adopts the following means in order to solve the problems. That is, a prepreg containing the following components [A] to [E], wherein 85% by mass or more of the component [E] is present in a range within 9% of the average thickness of the prepreg from each surface of the prepreg, a range within 7% of the average thickness of the prepreg from each surface of the prepreg is composed of a first resin composition containing the components [B] to [E], and the prepreg satisfies the following conditions (I) to (V).

[A] a carbon fiber

[B] an epoxy resin having two or more glycidyl groups in one molecule

[C] an aromatic amine compound

[D] a thermoplastic resin having a polyarylether skeleton

[E] a particle wherein primary particles have a number average particle size of 5 to 50 μm, the content ratio (% by mass) of a thermoplastic resin and a thermosetting resin of 95:5 to 70:30, and a size of a crack generated when the particle is immersed in methyl ethyl ketone and boiled and refluxed for 24 hours is 20 μm or less and the number of the crack is 5 or less Condition (I): The component [B] contains 80% by mass or more of an epoxy resin having a viscosity at 25° C. of $2.0 \times 10^4$ mPa·s or more.

Condition (II): The molar ratio of the number of active hydrogens in the component [C] to the number of epoxy groups in the component [B] is 0.7 to 1.3.

Condition (III): The prepreg contains 15 to 25% by mass of the component [D] with respect to 100% by mass of the component [B].

Condition (IV): The prepreg contains 50 to 80% by mass of the component [E] with respect to 100% by mass of the component [B].

Condition (V): The minimum value of loss tangent tan δ of the first resin composition in the temperature range of 12 to 25° C. is 1.0 or less.

In addition, the fiber-reinforced composite material of the present invention is a fiber-reinforced composite material having an open type (mode 1) interlaminar fracture toughness ($G_{Ic}$) obtained by heat-curing the prepreg of 400 J/m² or more.

Effects of the Invention

By using the prepreg of the present invention, when a fiber-reinforced composite material having excellent impact resistance is produced using an automatic lay up device, it becomes possible to lay up without adhesion and deposition of a part of the reinforced fibers or matrix resin in the device.

EMBODIMENTS OF THE INVENTION

The prepreg of the present invention contains the following components [A] to [E].

[A] a carbon fiber

[B] an epoxy resin having two or more glycidyl groups in one molecule

[C] an aromatic amine compound

[D] a thermoplastic resin having a polyarylether skeleton

[E] a particle wherein primary particles have a number average particle size of 5 to 50 μm, the content ratio (% by mass) of a thermoplastic resin and a thermosetting resin of 95:5 to 70:30, and a size of a crack generated when the particle is immersed in methyl ethyl ketone and boiled and refluxed for 24 hours is 20 μm or less and the number of the crack is 5 or less.

The type of the carbon fibers that are the component [A] of the present invention is not particularly limited, and pitch-based, acrylic-based and the like excellent in specific strength and specific elastic modulus are preferably used, acrylic-based carbon fibers are particularly preferably used.

As the form of carbon fibers, twisted yarn, untwisted yarn, and twistless yarn can be used, and since untwisted yarn or twistless yarn has parallel filament orientation, it is preferably used because of its good balance between moldability and strength characteristics of the fiber-reinforced composite material.

Component [B] of the present invention is an epoxy resin having two or more glycidyl groups in one molecule. Examples of the epoxy resin include bisphenol epoxy resins such as bisphenol A epoxy resins, bisphenol F epoxy resins, bisphenol AD epoxy resins and bisphenol S epoxy resins; brominated epoxy resins such as tetrabromobisphenol A diglycidyl ethers; epoxy resins having a biphenyl skeleton; epoxy resins having a naphthalene skeleton; epoxy resins having a dicyclopentadiene skeleton; novolac epoxy resins such as phenol novolac epoxy resins and cresol novolac epoxy resins; glycidyl amine epoxy resins such as N,N,O-triglycidyl-m-aminophenol, N,N,O-triglycidyl-p-aminophenol, N,N,O-triglycidyl-4-amino-3-methylphenol, N,N,N',N'-tetraglycidyl-4,4'-methylenedianiline, N,N,N',N'-tetraglycidyl-2,2'-diethyl-4,4'-methylenedianiline, N,N,N',N'-tetraglycidyl-m-xylylenediamine, N,N-diglycidylaniline and N,N-diglycidyl-o-toluidine; resorcinol diglycidyl ether; triglycidyl isocyanurate; and the like. Among them, in the case of aircraft, spacecraft applications and the like, it is preferable to contain a glycidyl amine epoxy resin from which a cured product having a high glass transition temperature and elastic modulus is obtained. In addition, it is necessary to contain 80% by mass or more of an epoxy resin having a viscosity at 25° C. of $2.0 \times 10^4$ mPa·s or more in the component [B], thereby suppressing tackiness properties of the obtained prepreg, and when a fiber-reinforced composite material is produced using an automatic lay up device, adhesion of the resin can be suppressed.

These epoxy resins may be used alone or in combination. Blending an epoxy resin showing fluidity at an arbitrary temperature with an epoxy resin showing no fluidity at an arbitrary temperature is effective for fluidity control of the matrix resin when heat curing the obtained prepreg. For example, when the matrix resin has high fluidity before its gelation during heat curing, an orientation of the reinforced fibers is disturbed, or the matrix resin flows out of the system, whereby a fiber volume content of the obtained fiber-reinforced composite material may be out of the predetermined range, resulting in that mechanical properties of the obtained fiber-reinforced composite material may be deteriorated. In addition, combining plural kinds of epoxy resins showing different viscoelastic behavior at an arbitrary temperature is also effective for making tackiness properties of the obtained prepreg appropriate.

An epoxy compound other than the component [B], for example, a monoepoxy resin compound having only one epoxy group in one molecule, an alicyclic epoxy resin or the like can be appropriately blended with the prepreg of the present invention, as far as the effects, heat resistance and mechanical properties of the present invention are not significantly deteriorated.

The aromatic amine compound which is the component [C] of the present invention is used as a curing agent for heat-curing the epoxy resin of the component [B]. Examples of the aromatic amine compound include 3,3'-diisopropyl-4,4'-diaminodiphenylmethane, 3,3'-di-t-butyl-4,4'-diaminodiphenylmethane, 3,3'-diethyl-5,5'-dimethyl-4,4'-diaminodiphenylmethane, 3,3'-diisopropyl-5,5'-dimethyl-4,4'-diaminodiphenylmethane, 3,3'-di-t-butyl-5,5'-dimethyl-4,4'-diaminodiphenylmethane, 3,3',5,5'-tetraethyl-4,4'-diaminodiphenylmethane, 3,3'-diisopropyl-5,5'-diethyl-4,4'- diaminodiphenylmethane, 3,3'-di-t-butyl-5,5'-diethyl-4,4'-diaminodiphenylmethane, 3,3',5,5'-tetraisopropyl-4,4'-diaminodiphenylmethane, 3,3'-di-t-butyl-5,5'-diisopropyl-4,4'-diaminodiphenylmethane, 3,3',5,5'-tetra-t-butyl-4,4'-diaminodiphenylmethane, 4,4'-diaminodiphenylmethane, 4,4'-diaminodiphenyl sulfone, 3,3'-diaminodiphenyl sulfone, m-phenylenediamine, m-xylylenediamine, diethyltoluenediamine, and the like. Among them, in the case of aircraft, spacecraft applications and the like, it is preferable to use 4,4'-diaminodiphenyl sulfone and 3,3'-diaminodiphenyl sulfone that can obtain a cured product which is excellent in heat resistance and elastic modulus, in which a decrease in heat resistance due to linear expansion coefficient and moisture absorption is small. These aromatic amine compounds may be used alone or appropriately blended and used. Moreover, when mixed with other components, the aromatic amine compound may be any form of powder or liquid, and powdery and liquid aromatic amine compounds may be mixed and used.

In the present invention, the molar ratio of the number of active hydrogens in the component [C] to the number of epoxy groups in the component [B] needs to be 0.7 to 1.3, preferably 0.8 to 1.2. Here, the active hydrogen refers to a highly reactive hydrogen atom bonded to nitrogen, oxygen, or sulfur in an organic compound. When the molar ratio of the epoxy group and active hydrogen is outside the predetermined range, the heat resistance and elastic modulus of the obtained cured product may be decreased.

It is known that the aromatic amine compound which is the component [C] of the present invention generally has a slow progress of a crosslinking reaction. Therefore, a curing accelerator can be blended with the component [C] of the present invention to accelerate the reaction. Examples of the curing accelerator include tertiary amines, Lewis acid complexes, onium salts, imidazole compounds, urea compounds, and the like. The blending amount of the curing accelerator needs to be appropriately adjusted depending on the type to be used, and is 10% by mass or less, preferably 5% by mass or less with respect to 100% by mass of the total epoxy resin. When the curing accelerator is blended more than the above ranges, an excessive curing reaction occurs, which may cause a runaway reaction in which the reaction cannot be controlled.

The thermoplastic resin having a polyarylether skeleton, which is the component [D] of the present invention is blended for imparting toughness without impairing control of the tackiness properties of the obtained prepreg, control of fluidity of a matrix resin when heat curing a prepreg and heat resistance and elastic modulus of the obtained fiber-reinforced composite material. Examples of the thermoplastic resin having a polyarylether skeleton include polysulfone, polyphenylsulfone, polyethersulfone, polyetherimide, polyphenylene ether, polyetheretherketone, polyetherethersulfone, and the like. In particular, polyethersulfone is preferably used since it can impart toughness without deteriorating heat resistance and mechanical properties of the obtained fiber-reinforced composite material. These thermoplastic resins having a polyarylether skeleton can be used alone or in combination.

As a terminal functional group of these thermoplastic resins having a polyarylether skeleton, As a terminal functional group of these thermoplastic resins including a polyarylether skeleton, primary amine, secondary amine, a hydroxyl group, a carboxyl group, a thiol group, an acid anhydride, a halogen group (chlorine, bromine) and the like can be used, a hydroxyl group, a carboxyl group, a thiol group, an acid anhydride, a halogen group (chlorine, bromine) and the like can be used.

The content of the thermoplastic resin having a polyarylether skeleton which is the component [D] of the present invention is in the range of 15 to 25% by mass with respect to 100% by mass of the component [B]. By setting the content of the thermoplastic resin to the above range, it is possible to balance the viscosity of the resin composition, eventually, the tackiness properties of the obtained prepreg, and the mechanical properties of the obtained fiber-reinforced composite material.

The component [E] of the present invention has a number average particle size of primary particles of 5 to 50 μm, and is blended to add impact resistance to the fiber-reinforced composite material obtained by the present invention. The fiber-reinforced composite material generally has a laminated structure, and when an impact is applied to the fiber-reinforced composite material, high stress is generated between layers, and delamination damage occurs. Therefore, in the case of improving the impact resistance against an impact from the outside, toughness of a resin layer formed between layers (hereinafter sometimes referred to as "interlayer resin layer") composed of the component [A] of the fiber-reinforced composite material should be improved. In the present invention, the component [D] is blended with the epoxy resin composition which is a matrix resin to improve the toughness. Furthermore, the component [E] is blended to selectively increase the toughness of the interlayer resin layer of the fiber-reinforced composite material obtained in the present invention.

The component [E] of the present invention is particles composed of a thermoplastic resin and a thermosetting resin. Specific examples of the thermoplastic resin include polyamide and polyimide, and polyamide that can greatly improve the impact resistance is more preferably used due to its particularly excellent toughness. As the polyamide, nylon 12, nylon 11, nylon 6, nylon 6/12 copolymer and the like can be suitably used.

When the particles contained in the prepreg are composed only of a thermoplastic resin, solvent resistance often becomes a problem. When a fiber-reinforced composite material is used as a structural member and a skin, its surface is often painted, and it may be exposed to hydraulic oil or fuel in aircraft and automotive applications, and particles composed only of a thermoplastic resin sometimes swell and deteriorate with such a chemical to deteriorate performance.

As a means for improving the chemical resistance of such a thermoplastic resin, there is a method of blending a small amount of a thermosetting resin with the component [E]. In this case, solvent resistance is dramatically improved by forming semi-IPN, one of interpenetrating polymer network structures (hereinafter abbreviated as IPN) in which a linear structure constituting the thermoplastic resin and a three-dimensional network structure formed by the thermosetting resin have interpenetrated each other. Therefore, for example, particles in which a crack is not substantially generated when immersed in methyl ethyl ketone and boiled and refluxed for 24 hours can be obtained. Here, the phrase "a crack is not substantially generated when immersed in methyl ethyl ketone and boiled and refluxed for 24 hours" refers that, when a test piece obtained by preparing a resin plate by filling target particles in a mold and applying a pressure of 40 kgf/cm$^2$ at 250° C. and cutting into a width of 20 mm and a length of 20 mm is immersed in 100 ml of methyl ethyl ketone (MEK), boiled and refluxed for 24 hours, and then an entire surface of the test piece is observed with a microscope VHX-5000 (manufactured by Keyence Corporation) at a magnification of 200 or more, the size of the generated cracks is 20 μm or less and the number of cracks is 5 or less.

The shape of the particles composed of the thermoplastic resin and the thermosetting resin which are the component [E] of the present invention is preferably spherical, which has excellent impregnation properties into a carbon fiber because flow characteristics of the matrix resin are not deteriorated, and at the time of drop-weight impact on a fiber-reinforced composite material, in a case where stress is applied to the fiber-reinforced composite material after such impact since delamination caused by local impact is further reduced, there are fewer delamination portions caused by the local impact, which becomes a starting point of fracture due to stress concentration, so that a fiber-reinforced composite material that exhibits high impact resistance can be obtained. However, in order to maintain the particle shape in the fiber-reinforced composite material, the glass transition temperature of the component [E] needs to be equal to or higher than the molding temperature, thus is preferably 170° C. or more. As a means of improving the glass transition temperature, although it depends on the thermosetting resin to be used, by using a material having a sufficiently high glass transition temperature (Tg), the Tg of the component [E] itself is increased and heat resistance is increased.

The component [E] of the present invention preferably forms such a semi-IPN structure, and in order to develop solvent resistance and impact resistance, the particles composed of the thermoplastic resin and the thermosetting resin of the component [E] need to have a content ratio (% by mass) of the thermoplastic resin and the thermosetting resin in the range of 95:5 to 70:30, and preferably in the range of 90:10 to 80:20. Examples of the thermosetting resin include unsaturated polyester resins, vinyl ester resins, epoxy resins, benzoxazine resins, phenol resins, urea resins, melamine resins, polyimide resins and the like, and the epoxy resin of the same type as the component [B] which is the main component of the matrix resin of the present invention is preferable because it can be used without deterioration in mechanical properties.

As a means for improving the impact resistance of the fiber-reinforced composite material obtained by the present invention, it is necessary to relieve the stress generated when an impact is applied. Therefore, the tensile elongation at break of the component [E] of the present invention is preferably 20% or more. By setting the tensile elongation at break to 20% or more, the stress generated between the layers can be relieved, and excellent compression after impact (CAI) can be obtained.

In order to selectively increase the toughness of the interlayer resin layer of the fiber-reinforced composite material obtained in the present invention, it is necessary to retain the component [E] of the present invention in the interlayer resin layer. Therefore, the number average particle size of the primary particles of the component [E] of the present invention needs to be in the range of 5 to 50 μm, preferably in the range of 7 to 40 μm, and more preferably in the range of 10 to 30 μm. By setting the number average particle size to 5 μm or more, the particles of the component [E] can remain in the interlayer resin layer of the obtained fiber-reinforced composite material without entering the bundle of carbon fibers as the component [A]. Also, by setting the number average particle size to 50 μm or less, the thickness of the matrix resin layer on the prepreg surface is optimized, eventually, excellent open type (mode 1) interlaminar fracture toughness ($G_{Ic}$) is obtained in the obtained fiber-reinforced composite material, and also, the volume content of the carbon fibers as the component [A] can be optimized. Here, as the number average particle size of the primary particles, the component [E] is observed with a laser microscope (ultra-depth color 3D shape measurement microscope VK-9510: manufactured by Keyence Corporation) at a magnification of 200 or more, and for arbitrary 50 or more particles, the diameter of a circle circumscribing the particle is measured as the particle size, then the average value is used.

The content of the particles composed of the thermoplastic resin and the thermosetting resin which are the component [E] of the present invention is in the range of 50 to 80% by mass and preferably in the range of 65 to 75% by mass with respect to 100% by mass of the component [B]. By setting the blending amount of the thermoplastic resin to the above range, it is possible to balance the viscosity of the mixture, eventually, the tackiness properties of the obtained prepreg, and the mechanical properties of the obtained fiber-reinforced composite material.

On the other hand, loss tangent tan δ of the first resin composition present in a range within 7% of the average thickness of the prepreg from each surface of the prepreg is correlated with the tackiness properties of the prepreg, and a prepreg using a matrix resin having a small loss tangent tan δ exhibits a lower viscosity and the tackiness properties tend to be suppressed. Here, the first resin composition is a resin composition containing the components [B] to [E], and is a composition present in a range within 7% of the average thickness of the prepreg from each surface of the prepreg.

In the case of producing a fiber-reinforced composite material using the prepreg obtained in the present invention and an automatic lay up device, in order to lay up without adhesion and deposition of a part of the reinforced fibers or first resin composition in the device, the minimum value of the loss tangent tan δ of the first resin composition in the temperature range of 12 to 25° C. needs to be 1.0 or less. The component [B] contains 80% by mass or more of an epoxy resin having a viscosity at 25° C. of $2.0 \times 10^4$ mPa·s or more, the molar ratio of the number of active hydrogens in the component [C] to the number of epoxy groups in the component [B] is 0.7 to 1.3, the prepreg contains 15 to 25% by mass of the component [D] with respect to 100% by mass of the component [B], and the prepreg contains 50 to 80% by mass of the component [E] with respect to 100% by mass of the component [B], whereby it is possible to set the minimum value of the loss tangent tan δ of the first resin composition in the temperature range of 12 to 25° C. to 1.0 or less. The minimum value of the loss tangent tan δ in the temperature range of 12 to 25° C. is 1.0 or less, whereby a good fiber-reinforced composite material can be obtained without generating deposit in the device, and efficient production can be achieved.

The prepreg of the present invention preferably has the following constitution. That is, a prepreg in which a layer containing the following components [B] to [E] (hereinafter referred to as "layer a") is laminated, on both sides of a sheet base material layer, containing [A] a carbon fiber, and optionally containing [E] a particle wherein primary particles have a number average particle size of 5 to 50 μm, the content ratio (% by mass) of a thermoplastic resin and a thermosetting resin of 95:5 to 70:30, and a size of a crack generated when the particle is immersed in methyl ethyl ketone and boiled and refluxed for 24 hours is 20 μm or less and the number of the crack is 5 or less,

[B] an epoxy resin having two or more glycidyl groups in one molecule,

[C] an aromatic amine compound,

[D] a thermoplastic resin having a polyarylether skeleton, and the particle [E], and the prepreg satisfies the following conditions (I) to (VI) in the layer, Condition (I): 80% by mass or more of the component [B] is an epoxy resin having a viscosity at 25° C. of $2.0 \times 10^4$ mPa·s or more.

Condition (II): The ratio of the number of active hydrogens in the component [C] to the number of epoxy groups in the component [B] is 0.7 to 1.3 as a molar ratio.

Condition (III): The prepreg contains 15 to 25 parts by mass of the component [D] with respect to 100 parts by mass of the component [B].

Condition (IV): The prepreg contains 50 to 80 parts by mass of the component [E] with respect to 100 parts by mass of the component [B].

Condition (V): The minimum value of loss tangent tan δ of a resin composition comprising the layer in the temperature range of 12 to 25° C. is 1.0 or less.

Condition (VI): The thickness of the layer is 7% or more of the average thickness of the prepreg.

And 85% by mass or more of the particle [E] is present in a region from both surfaces of the prepreg to 9% of the average thickness.

Here, the sheet base material layer refers to a sheet-like material containing the component [A] and optionally containing the component [E], and a resin layer is laminated on both surfaces thereof. The layer to be laminated is a resin composition containing the components

[B] to [E] and satisfies the conditions (I) to (VI). The upper limit of the thickness in the condition (VI) is not particularly limited, and is preferably 15% or less of the average thickness of the prepreg, and further preferably 9% or less of the average thickness of the prepreg. Further, another layer can be provided between the sheet base material layer and the "layer a".

In addition, in order to improve lay up properties of the prepreg and a laminate during lay up and to obtain good processability, the maximum value of the loss tangent tan δ of the first resin composition in the temperature range of 25° C. to 45° C. is preferably 2.2 or more, more preferably 2.4 or more, and further preferably 2.6 or more.

The prepreg of the present invention can be produced by various known methods. For example, the prepreg can be produced by a wet process in which a matrix resin is dissolved in an organic solvent selected from acetone, methyl ethyl ketone, methanol and the like to reduce its viscosity, and impregnated into reinforced fibers, or a hot-melt process in which a matrix resin is heated to reduce its viscosity without using an organic solvent and impregnated into reinforced fibers.

In the wet process, it is possible to immerse the reinforced fibers in a liquid containing a matrix resin, then pull it up, and evaporate the organic solvent using an oven or the like to obtain a prepreg.

Further, in the hot-melt process, a method of directly impregnating reinforced fibers with a matrix resin heated to reduce its viscosity, a method of impregnating reinforced fibers with a matrix resin by first preparing a release paper sheet with a resin film once coated with a matrix resin on a release paper or the like (hereinafter also referred to as "resin film"), then laminating a resin film on the reinforced fiber side from both sides or one side of the reinforced fibers, followed by heating and pressurizing, or the like can be used.

As a method for producing the prepreg of the present invention, a hot-melt process of impregnating reinforced fibers with a matrix resin without using an organic solvent is preferable since the prepreg is substantially free of organic solvent residue.

Specific examples of the method for preparing the prepreg of the present invention by the hot-melt process include the following methods, and it is possible to produce the prepreg of the present invention by any method. That is, a first method is a so-called single stage impregnation hot-melt process in which a resin film containing the components [B] to [E] of the present invention is impregnated with a matrix resin in a single stage, by heating and pressurizing from both sides or one side of the component [A]. A second method is a multiple-stage impregnation hot-melt process in which a matrix resin is divided into multiple stages and impregnated by heating and pressurizing from both sides or one side of the component [A]. In the multiple-stage impregnation hot-melt process, the number of times the component [A] is impregnated with the matrix resin is not limited, and the production cost increases as the number of times increases. Therefore, a so-called two-stage impregnation hot-melt process in which a matrix resin is divided into two stages and impregnated by heating and pressurizing from both sides or one side of the component [A] is preferably used. Among the two-stage impregnation hot-melt processes, a method in which, first, a resin film 1 containing the components [B] to [D] is impregnated from both sides or one side of the component [A] to obtain a prepreg precursor, and then a resin film 2 containing the components [B] to [E] is stuck on both sides or one side of the prepreg precursor to obtain a prepreg is preferably used.

When the one-stage impregnation hot-melt process is used, in a process of impregnating the component [A] with the resin film containing the components [B] to [E] of the present invention, the component [A] blocks entry of the particles of the component [E], whereby the component [E] is selectively disposed on the surface of the prepreg. However, it is difficult to block all the particles of the component [E] with the component [A], and a part of the component [E] may enter the layer composed of the component [A].

On the other hand, when the two-stage impregnation hot-melt process is used, the component [A] is first impregnated with the resin film 1 that does not contain the component [E], and the resin film 2 containing the component [E] is stuck on the obtained prepreg precursor, whereby the particles of the component [E] can be selectively disposed on the prepreg surface. Therefore, in the prepreg obtained by the two-stage impregnation hot-melt process, 85% by mass or more of the component [E] is present in a range corresponding to within 9% of the average thickness of the prepreg from each surface of the prepreg measured by the method described later. In the prepreg of the present invention, it is necessary that the particles of the component [E] are selectively disposed in the range corresponding to within 9% of the average thickness of the prepreg from each surface of the prepreg, and 85% by mass thereof is present, whereby it possible to obtain a fiber-reinforced composite material having high impact resistance. The two-stage impregnation hot-melt process is preferable since more particles of the component [E] can be disposed on the prepreg surface.

The matrix resin containing the components [B] to [E] (hereinafter referred to as an epoxy resin composition) used in the present invention can be produced by various known methods. Examples include a method of kneading each component with a kneader. Moreover, each component may be kneaded using a biaxial extruder.

When the prepreg of the present invention is produced by the above-described two-stage impregnation hot-melt process, it is preferable to use a second resin composition containing the components [B] to [D] to be impregnated into the component [A] in the first stage, and a first resin composition containing the components [B] to [E] on which both sides or one side of the prepreg precursor obtained by impregnating the component [A] with the second resin composition is stuck.

In the prepreg of the present invention, the second resin composition is a resin composition excluding the component [A] of a part excluding the first resin composition. A complex viscosity $\eta^*$ of the second resin composition at 80° C. is preferably 1.0 to $1.5 \times 10^1$ Pa·s. The second resin composition can preferably contain the component [B], the component [C] and the component [D] described above, and can optionally contain the component [E].

When the second resin composition is produced with a kneader, for example, first, the components [B] and [D] are heated and mixed at a temperature in the range of 130 to 160° C. Here, it is preferable to dissolve until a solid matter of the component [D] does not exist. After cooling the solution to a temperature of 50° C. or less, an aromatic amine compound as the component [C] is added thereto and kneaded.

Since the obtained second resin composition is impregnated into the component [A], viscosity characteristics are important. When the viscosity of the obtained second resin composition is too low, a large amount of resin flow occurs during molding and the amount of resin decreases, so that the mechanical properties may be deteriorated. In addition, when the viscosity of the obtained second resin composition is too high, it may cause fading in a film forming step of the epoxy resin composition in the hot-melt process, or an unimpregnated part may be generated in an impregnation step into the reinforced fibers. Therefore, the complex viscosity $\eta^*$ at a temperature of 80° C. is preferably 1.0 to $1.5 \times 10^1$ Pa·s.

Here, the complex viscosity $\eta^*$ at a temperature of 80° C. was determined using a dynamic viscoelasticity measuring device ARES-G2 (manufactured by TA Instruments) and flat parallel plates with a diameter of 40 mm for upper and lower measurement jigs by setting the epoxy resin composition so that a distance between the upper and lower jigs is 1.0 mm, and then measuring a measurement temperature range of 40 to 140° C. at a temperature elevation rate of 1.5° C./min in torsion mode (measurement frequency: 0.5 Hz).

Also, when the first resin composition is produced with a kneader, for example, first, the components [B] and [D] are heated and mixed at a temperature in the range of 130 to 160° C. Here, it is preferable to dissolve until a solid matter of the component [D] does not exist. After cooling the solution to a temperature of 50° C. or less, the component [E] is dispersed at this stage. Here, the particles composed of the thermoplastic resin and the thermosetting resin which are the component [E] often form aggregates, and when all the components are kneaded at once, the dispersion may be poor. Finally, the aromatic amine compound as the component [C] is added thereto and kneaded.

The obtained first resin composition is stuck on both sides or one side of the prepreg precursor, and the tackiness properties of the obtained prepreg are strong when the viscosity is low, and the tackiness properties are low when the viscosity is high, thus handling properties of the prepreg are deteriorated. Therefore, viscosity characteristics of the first resin composition need to satisfy the following conditions (I) to (V). That is, Condition (I): The component [B] contains 80% by mass or more of an epoxy resin having a viscosity at 25° C. of $2.0 \times 10^4$ mPa·s or more.

Condition (II): The molar ratio of the number of active hydrogens in the component [C] to the number of epoxy groups in the component [B] is 0.7 to 1.3.

Condition (III): The prepreg contains 15 to 25% by mass of the component [D] with respect to 100% by mass of the component [B].

Condition (IV): The prepreg contains 50 to 80% by mass of the component [E] with respect to 100% by mass of the component [B].

Condition (V): The minimum value of loss tangent tan δ of the first resin composition in the temperature range of 12 to 25° C. is 1.0 or less.

Here, the viscosity is measured according to "the Method for Viscosity Measurement with a Cone-Plate Type Rotary Viscometer" in JIS Z8803 (2011) at a rotation speed of 10 rotations/min at 25° C., using an E type viscometer (TVE-30H manufactured by TOKI SANGYO CO., LTD) equipped with a standard cone rotor (1° 34'×R24), and the value obtained in one minute after the start of measurement is taken.

Further, a complex viscosity $\eta^*$ of the obtained first resin composition at a temperature of 80° C. is preferably $3.0 \times 10^2$ to $1.5 \times 10^3$ Pa·s. By setting the $\eta^*$ to $3.0 \times 10^2$ or more, the resin flow with time on the prepreg surface is small, and the amount of surface resin is maintained, so that there is little reduction in tackiness and the handling properties tend to be good. In addition, when the $\eta^*$ is set to $1.5 \times 10^3$ or less, the film forming step of the epoxy resin composition in the hot-melt process tends to be good.

Here, the complex viscosity $\eta^*$ of the first resin composition at a temperature of 80° C. can be measured by the same method as that for the second resin composition.

Moreover, the loss tangent tan δ of the first resin composition was determined using a dynamic viscoelasticity measuring device ARES-G2 (manufactured by TA Instruments) and flat parallel plates with a diameter of 8 mm for upper and lower measurement jigs, by setting the epoxy resin composition so that a distance between the upper and lower jigs is 0.5 mm, then measuring a measurement temperature range of 10 to 100° C. at a temperature elevation rate of 1.5° C./minute in torsion mode (measurement frequency: 1.6 Hz), and in the obtained temperature-loss tangent tan δ curve, obtaining the minimum value in the temperature range of 12 to 25° C. and the maximum value in the temperature range of 25 to 45° C.

In the prepreg of the present invention, the range within 7% of the average thickness of the prepreg from each surface of the obtained prepreg is composed of the second resin composition containing the components [B] to [D]. That is, the component [A] is not contained in the range within 7% of the average thickness of the prepreg from each surface of the prepreg. By using a prepreg having such a structure, an interlayer resin layer can be formed in the obtained fiber-reinforced composite material. Here, the thickness of the matrix resin layer on the prepreg surface can be evaluated by the following method. Specifically, the prepreg obtained in the present invention is sandwiched between two smooth support plates and closely contacted, and is cured by gradually raising the temperature over a long period of time. What is important at this time is to allow gelation at a temperature as low as possible. When the temperature is raised before gelation, the resin in the prepreg flows, and accurate thickness of the matrix resin layer cannot be evaluated, so after the gelation, the temperature is further gradually increased over time to cure the prepreg to obtain a fiber-reinforced composite material. A cross section of the obtained fiber-reinforced composite material is polished and photographed by an epi-illumination type optical microscope at a magnification of 200 or more. Using this cross-sectional photograph, first, the average thickness of the prepreg is determined. As the average thickness of the prepreg, the thickness is measured at least 5 points arbitrarily selected on the photograph, and the average thereof is taken. Subsequently, the thickness of the matrix resin layer formed on the surface of the fiber-reinforced composite material is obtained. The thickness of the matrix resin layer is also measured at least 5 points arbitrarily selected on the photograph, and the average thereof is taken. The ratio can be calculated from the average thickness of the prepreg and the average thickness of the matrix resin layer obtained.

In addition, the prepreg of the present invention preferably has an embodiment of the following laminated constitution. That is, the prepreg in which a layer containing the components [B] to [E] ("layer a") is laminated from the surface to the inside, having a layer present inside thereof (sheet base material layer) containing the component [A] and optionally containing the component [E]. Here, the component [A] to the component [E] have the same meaning as the meaning described above. In the "layer a", the following conditions (I) to (VI) are satisfied. Also, the component [A] is not usually contained in the "layer a".

Condition (I): 80% by mass or more of the component [B] is an epoxy resin having a viscosity at 25° C. of $2.0 \times 10^4$ mPa·s or more.

Condition (II): The ratio of the number of active hydrogens in the component [C] to the number of epoxy groups in the component [B] is 0.7 to 1.3 as a molar ratio.

Condition (III): The prepreg contains 15 to 25 parts by mass of the component [D] with respect to 100 parts by mass of the component [B].

Condition (IV): The prepreg contains 50 to 80 parts by mass of the component [E] with respect to 100 parts by mass of the component [B].

Condition (V): The minimum value of loss tangent tan δ of a resin composition comprising the layer in the temperature range of 12 to 25° C. is 1.0 or less.

Condition (VI): The thickness of the layer is 7% or more of the average thickness of the prepreg.

In addition, since the prepreg of the present invention can be easily prepared, the sheet base material layer preferably contains any or all of the component [B], the component [C], and the component [D], and preferably adopts a constitution of "layer a"/sheet base material layer/"layer a". In such a case, it is possible to specify the sheet base material layer by confirming whether or not the component [A] is contained.

As a method for obtaining a prepreg having such a laminated constitution, a lamination method such as a normal laminating method can be adopted while preparing the prepreg so that each layer can be formed with each component. In the state before the "layer a" is constituted in the sheet base material layer, preferably, the sheet base material layer does not necessarily have to contain the component [E].

Moreover, in the prepreg of the present invention, it is necessary that 85% by mass or more of the component [E] is present in a range within 9% of the average thickness of the prepreg from each surface of the obtained prepreg. That is, the component [E] needs to be localized on the surface of the prepreg. By using a prepreg having such a structure, it becomes possible to form an interlayer resin layer in which the component [E] is locally disposed in the obtained fiber-reinforced composite material, and a fiber-reinforced composite material having high impact resistance can be obtained.

The degree of localization of particles in the prepreg can be evaluated by the following method. Specifically, after obtaining a fiber-reinforced composite material according to the aforementioned method, a cross section thereof is polished and photographed by an epi-illumination type optical microscope at a magnification of 200 or more. Using this cross-sectional photograph, first, the average thickness of the prepreg is determined. As the average thickness of the prepreg, the thickness is measured at least 5 points arbitrarily selected on the photograph, and the average thereof is taken. Next, a line is drawn parallel to the outermost surface of the prepreg at a position of 9% of the thickness of the prepreg from the surface that is in contact with both support plates. The sum of cross-sectional areas of each particle present between the surface in contact with the support plate and the 9% parallel line is quantified on both sides of the prepreg. Further, the sum of the cross-sectional areas of the particles of the component [E] present over the total thickness of the prepreg is also quantified. The ratio of the sum of the cross-sectional areas of the particles present in the range corresponding to the average thickness of 9% of the prepreg from the surface of the prepreg to the sum of the cross-sectional areas of the particles present over the total thickness of the prepreg is defined as the amount of particles present within 9% of the average thickness of the prepreg from the prepreg surface. The quantification of the particle cross-sectional area may be performed by an image analyzer or by cutting out all the particle portions present in a predetermined region from the cross-sectional photograph and measuring the mass thereof. In order to eliminate an influence of variation in the partial distribution of particles, it is necessary to perform this evaluation over the entire width of the obtained photograph, and perform the same evaluation for photographs of 5 or more arbitrarily selected points, then take the average thereof. When it is difficult to distinguish between the particles and the matrix resin, one of them is selectively stained and observed. The microscope may be an optical microscope or a scanning electron microscope, and may be properly used depending on the size of the particles and the staining method. In the present invention, the ratio calculated by the area ratio as described above is defined as the mass ratio of fine particles present in a range corresponding to an average thickness of 9% of the prepreg from the surface of the prepreg.

In addition, the cross-sectional observation of the obtained fiber-reinforced composite material was photographed with an epi-illumination type optical microscope at a magnification of 200 or more, and the diameter of the particles of the component [E] is measured, whereby the number average particle size of the component [E] can be obtained. Specifically, a value obtained by measuring particle size of 100 arbitrary particles for the particles of the component [E] and then averaging them is used as the number average particle size.

The preferable range of the number average particle size of the component [E] is the same as the range of the preferable number average particle size described above.

Furthermore, the prepreg of the present invention has a volume content of the carbon fibers as the component [A] (hereinafter referred to as Vf) preferably in the range of 50 to 65% by volume, more preferably in the range of 53 to 62% by volume, and further preferably in the range of 55 to 60% by volume. By setting Vf to the above ranges, an increase in the mass of the fiber-reinforced composite material is prevented, and occurrence of defects such as unimpregnated parts and voids inside the fiber-reinforced composite material is suppressed, thus a fiber-reinforced composite material having excellent mechanical properties can be obtained. Here, the Vf of the prepreg is a value determined by the following method. Specifically, a test piece of 100×100 mm is cut out of the prepreg obtained in the present invention, the thickness thereof is measured with a micrometer, and the volume is calculated. Subsequently, a carbon fiber mass per unit area is measured according to a testing method of "Prepreg mass per unit area, and carbon fiber mass, resin mass content, and fiber mass content per unit area" described in JIS K7071 (1988), and a volume is calculated using a density presented by a carbon fiber manufacturer and then divided by the volume of the test piece. The thus calculated value is used as the Vf of the prepreg.

On the other hand, in the prepreg of the present invention, the minimum value of the loss tangent tan δ of the first resin composition present in a range within 7% of the average thickness of the prepreg from each surface of the prepreg needs to be 1.0 or less, and is preferably 0.8 or less and more preferably 0.6 or less, at 12 to 25° C. that is a use environment temperature of the automatic lay up device. By using a prepreg having such a structure, tackiness is suppressed during molding, so that resin adhesion in the automatic lay up is suppressed, and good processability is obtained. The resin adhesion on the prepreg surface during molding can be evaluated by the following method. Specifically, the prepreg obtained in the present invention is cut into a size of 800 mm in the fiber direction and 6.35 mm in the direction perpendicular to the fiber, and the mass of the obtained prepreg test piece is measured with an electronic balance. Subsequently, it is abraded 700 mm over 5 seconds at an angle of 90° with respect to an end face of a 10 mm-thick aluminum plate chamfered to C0.1 while applying a load of 1.5 kg to the longitudinal end of the cut prepreg test piece. The mass of the abraded prepreg test piece is measured with the previous electronic balance, a value obtained by calculating the percent change in mass by the following formula (1) is preferably in the range of 0.1% or less.

$$W0 = (W1 - W2)/W1 \times 100 \quad \text{Formula (1)}$$

W0: Percent change in mass (%)
W1: Prepreg mass before abrasion (g)
W2: Prepreg mass after abrasion (g)

On the other hand, when the prepregs are layed up, it is preferable that stickiness is good in order to keep the stuck state during lay up. Here, stickiness can be evaluated by the following method. Specifically, the prepreg obtained in the present invention is cut into a size of 800 mm in the fiber direction and 6.35 mm in the direction perpendicular to the fiber. Subsequently, in an environment of 35±2° C. and relative humidity 50±10%, the cut prepreg test piece is attached to a mirror-finished vertical plate made of SUS404, and a state that the prepreg test piece is not peeled off from the plate after 1 hour is determined to have good stickiness.

The fiber-reinforced composite material of the present invention can be obtained by curing the prepreg of the present invention. When forming a fiber-reinforced composite material using a prepreg, various known methods can be used. For example, a method in which the obtained prepreg is cut into a predetermined size and singly or a predetermined number of prepregs are layed up and then heat-cured while applying pressure or the like can be preferably used.

As the method for heat-curing while applying pressure to the prepreg laminate, there are a press molding method, an autoclave molding method, a bagging molding method, a wrapping tape method, an internal pressure molding method, and the like, and they are properly used depending on the intended use. Among them, in the case of aircraft and spacecraft applications, a fiber-reinforced composite material having excellent performance and stable quality can be obtained, and thus, an autoclave molding method is often applied.

The temperature at which the fiber-reinforced composite material is molded needs to be appropriately adjusted depending on the type of the curing agent contained in the epoxy resin composition. In the present invention, since the aromatic amine compound which is the component [C] is used as the curing agent, molding is usually performed at a temperature in the range of 150 to 220° C. When the molding temperature is too low, sufficient fast curability may not be obtained. Conversely, when the molding temperature is too high, warpage due to thermal strain may be likely to occur.

The pressure for molding the fiber-reinforced composite material by the autoclave molding method varies depending on the thickness of the prepreg, the volume content of the carbon fiber, and the like, but is usually a pressure in the range of 0.1 to 1 MPa. By setting the molding pressure to the above range, a fiber-reinforced composite material free from defects such as voids and free from dimensional variations such as warpage can be obtained in the obtained fiber-reinforced composite material.

In order to selectively increase the toughness of the interlayer resin layer of the fiber-reinforced composite material obtained in the present invention, the component [E] of the present invention is retained in the interlayer resin layer, so that it is characterized by having excellent open type (mode 1) interlaminar fracture toughness ($G_{Ic}$). As the open type (mode 1) interlaminar fracture toughness ($G_{Ic}$) of the present invention, according to JIS K 7086 (1993), using a test piece with a width of 20 mm and a length of 250 mm made of a fiber-reinforced composite material with a film inserted in the center of 3 mm thickness and an Instron universal testing machine (manufactured by Instron), the open type (mode 1) interlaminar fracture toughness ($G_{Ic}$) when the crosshead speed is 0.5 mm/min till the crack propagation reached 20 mm and 1.0 mm/min after reaching 20 mm is preferably 400 J/m$^2$ or more.

The fiber-reinforced composite material obtained by the present invention is characterized in that the particles composed of the thermoplastic resin and the thermosetting resin which are the component [E] are blended and have high impact resistance.

Such impact resistance can be measured by compression after impact (hereinafter referred to as CAI). As the CAI of the fiber-reinforced composite material of the present invention, the CAI after imparting an impact energy of 6.7 J per 1 mm thickness of the test piece according to JIS K 7089 (1996) is preferably 280 MPa or more, more preferably 300 MPa or more, and further preferably 310 MPa or more. When the CAI is lower than the above ranges, the strength may be insufficient, and the fiber-reinforced composite material cannot be used particularly for structural members such as aircraft. The upper limit of CAI is not particularly limited, and the higher the value, the higher the safety when the fiber-reinforced composite material is applied as a structural member.

EXAMPLES

Hereinafter, the prepreg and the fiber-reinforced composite material of the present invention will be described more specifically with reference to examples. In addition, a unit of a composition ratio "part(s)" means % by mass unless otherwise noted. Further, measurement of various properties (physical properties) was performed under the environment of 23° C. in temperature and 50% in relative humidity unless otherwise noted.

<Materials Used in Examples>

(1) Component [A]: Carbon Fibers
"TORAYCA (registered trademark)" T800 S-24K-10E (number of fibers: 24,000, fineness: 1,033 tex, tensile modulus: 294 GPa, density: 1.8 g/cm$^3$, manufactured by Toray Industries, Inc.)

(2) Component [B]: Epoxy Resin Having Two or More Glycidyl Groups in One Molecule
"SUMI-EPOXY (registered trademark)" ELM434 (component: tetraglycidyl diaminodiphenylmethane, manufactured by Sumitomo Chemical Co., Ltd., viscosity at 25° C.: 2.2×10$^4$ mPa·s, epoxy equivalent: 119).
"SUMI-EPDXY (registered trademark)" ELM120 (component: triglycidyl-m-aminophenol, manufactured by Sumitomo Chemical Co., Ltd., viscosity at 25° C.: 2.0×10$^4$ mPa·s, epoxy equivalent: 118)
"EPICLON (registered trademark)" HP-4032 (component: naphthalene type epoxy resin, manufactured by DIC Corporation, viscosity at 25° C.: 2.4×10$^4$ mPa·s, epoxy equivalent: 153).
"EPICLON (registered trademark)" 830 (component: bisphenol F type epoxy resin, manufactured by DIC Corporation, viscosity at 25° C.: 3500 mPa·s, epoxy equivalent: 172.5)
GAN (N,N-diglycidylaniline, manufactured by Nippon Kayaku Co., Ltd., viscosity at 25° C.: 130 mPa·s, epoxy equivalent: 125).

(3) Component [C]: Aromatic Amine Compound
"SEIKACURE (registered trademark)" S (4,4'-diaminodiphenylmethane, manufactured by SEIKA CORPORATION, amine equivalent: 62)
3,3'-DAS (3,3'-diaminodiphenyl sulfone, manufactured by Konishi Chemical Ind. Co., Ltd., amine equivalent: 62).

(4) Component [D]: Thermoplastic Resin Having Polyarylether Skeleton
"VIRANTAGE (trademark registration)" VW-10700RFP (component; terminal hydroxyl group polyethersulfone, manufactured by Solvay Specialty Polymers)
"SUMIKAEXCEL (registered trademark)" PES5003P, (polyethersulfone manufactured by Sumitomo Chemical Co., Ltd.).

(5) Component [E]: Particles Composed of Thermoplastic Resin and Thermosetting Resin
Epoxy-modified nylon particles A (number average particle size: 13 μm) obtained by the following production method To a mixed solvent of 300 parts of chloroform and 100 parts of methanol were added 90 parts of a transparent polyamide ("Grilamid (registered trademark)" TR55, manufactured by EMS-CHEMIE (Japan) Ltd.), 7.5 parts of an epoxy resin ("jER (registered trademark)" 828, manufactured by Mitsubishi Chemical Corporation) and 2.5 parts of a curing agent ("Tohmide (registered trademark)" #296, manufactured by T&K TOKA Corporation), and thus a homogeneous solution was obtained. Next, the obtained homogeneous solution was sprayed against a liquid surface of 3,000 parts of n-hexane under stirring using a spray gun for painting to precipitate a solute. The precipitated solid was separated by filtration, washed well with n-hexane, and then vacuum-dried at a temperature of 100° C. for 24 hours to obtain spherical epoxy-modified nylon particles A.

(6) Resin Particles Other than Component [E]
"Grilamid (registered trademark)" TR-55 particles (particles prepared using "Grilamid (registered trademark)"-TR55 as a raw material, with number average particle sizes of 13 μm and 60 μm)
Toray nylon fine particles SP-10 (manufactured by Toray Industries, Inc., number average particle size: 10 μm)
"Torlon (registered trademark)" 4203L (polyamide-imide, average particle size: 15 μm)
Polycarbonate particles (number average particle size: 13 μm) obtained by the following production method 5 g of "TARFLON (registered trademark)" A2200 (polycarbonate, manufactured by Idemitsu Kosan Co., Ltd.), 40 g of N-methyl-2-pyrrolidone, and 5 g of "Gohsenol (registered trademark)" GL-05 (polyvinyl alcohol, manufactured by The Nippon Synthetic Chemical Industry Co., Ltd.)) were added and heated to 80° C., and stirred until the polymer was dissolved. After dissolution, while stirring at 450 rpm while maintaining the temperature at 80° C., 100 g of ion-exchanged water was dropped as a poor solution at 1.64 g/min via a liquid feed pump. The obtained suspension was filtered and washed with 100 g of ion-exchanged water, and the filtrated product was freeze-dried for 10 hours to obtain spherical polycarbonate particles.

The number average particle size was measured according to "(1) Number Average Particle Size Measurement of Component [E]" in various evaluation methods described later.

<Various Evaluation Methods>

(1) Number Average Particle Size Measurement of Component [E] or Resin Particles The component [E] or the resin particles were observed with a laser microscope (ultra-depth color 3D shape measurement microscope VK-9510: manufactured by Keyence Corporation) at a magnification of 200 or more, and for arbitrary 100 particles, the diameter of a circle circumscribing the particle was measured as the particle size, then the average value was taken as the number average particle size of the component [E] or the resin particles.

(2) Viscosity Measurement of Component [B] or Epoxy Resin

For the component [B] or epoxy resin, the viscosity was measured according to "the Method for Viscosity Measurement with a Cone-Plate Type Rotary Viscometer" in JIS 28803 (2011) at a rotation speed of 10 rotations/min at 25° C., using an E type viscometer (TVE-30H manufactured by TOKI SANGYO CO., LTD) equipped with a standard cone rotor (1° 34'×R24), and the value obtained in one minute after the start of measurement was taken as the viscosity of the component [B] or the epoxy resin.

(3) Measurement of Glass Transition Temperature (Tg) of Component [E] or Resin Particles A sample having a mass of 10 mg was collected from the component [E] or the resin particles, and the midpoint glass transition temperature (Tmg) was measured according to JIS K7121 (1987). For the measurement, using a differential scanning calorimeter DSC Q2000 (manufactured by TA Instruments), the temperature in the range of 20° C. to 300° C. was measured twice at a temperature elevation rate of 10° C./min, and the average value was obtained.

(4) Measurement of Tensile Elongation at Break of Component [E] or Resin Particles The component [E] or the resin particles were filled in a mold, and applied with a pressure of 40 kgf/cm$^2$ at 250° C. to prepare a resin plate, which was then processed into a small test piece 1BB type as described in JIS K7161-2 (2014). The small test piece was pulled at a speed of 1 mm/min using an Instron universal testing machine (manufactured by Instron) according to JIS K7161-1 (2014), and the measured value was taken as the value of tensile elongation at break.

(5) Measurement of Solvent Resistance of Component [E] or Resin Particles

The component [E] or the resin particles were filled in a mold, and applied with a pressure of 40 kgf/cm$^2$ at 250° C. to prepare a resin plate, and the resin plate was cut into a width of 20 mm and a length of 20 mm. The obtained test piece was immersed in 100 ml of methyl ethyl ketone (MEK), boiled and refluxed for 24 hours, then the entire surface of the test piece was observed with a microscope VHX-5000 (manufactured by Keyence Corporation) at a magnification of 200 or more, and the number of cracks generated was measured.

(6) Complex Viscosity Measurement of Epoxy Resin Composition

The complex viscosity of the second resin composition containing the components [B] to [D] obtained in each Example and Comparative Example, and the first resin composition containing the components [B] to [E] were determined, using a dynamic viscoelasticity measuring device ARES-G2 (manufactured by TA Instruments) and flat parallel plates with a diameter of 40 mm for upper and lower measurement jigs, by setting the epoxy resin composition so that a distance between the upper and lower jigs is 1.0 mm, and then measuring a measurement temperature range of 40 to 140° C. at a temperature elevation rate of 1.5° C./min in torsion mode (measurement frequency: 0.5 Hz).

(7) Measurement of Loss Tangent Tan δ of Epoxy Resin Composition

The first resin composition containing the components [B] to [E] obtained in each Example and Comparative Example was determined, using a dynamic viscoelasticity measuring device ARES-G2 (manufactured by TA Instruments) and flat parallel plates with a diameter of 8 mm for upper and lower measurement jigs, by setting the epoxy resin composition so that a distance between the upper and lower jigs is 0.5 mm, and then measuring a measurement temperature range of 10 to 60° C. at a temperature elevation rate of 1.5° C./min in torsion mode (measurement frequency: 1.6 Hz).

(8) Evaluation of Components Present in Range within 7% of Average Thickness of Prepreg from Each Surface of Prepreg The prepreg obtained in each Example and Comparative Example was sandwiched between two smooth polytetrafluoroethylene resin plates on the surface and closely contacted, and the temperature was gradually raised to 150° C. over 7 days so as to gelatinize and cure the prepregs, thereby preparing a plate-like cured product. After curing, the prepreg was cut in a direction (thickness direction) perpendicular to a close contact surface with the resin plate, and the cross section was polished. Using an epi-illumination type optical microscope, the prepreg cross-section was magnified 200 times or more, and photographs were taken so that the upper and lower surfaces were within the field of view. The distance between the polytetrafluoroethylene resin plates was measured at 5 spots in the transverse direction of the cross-sectional photograph, and the average value thereof was taken as the average thickness of the prepreg.

Further, from this photograph, the presence or absence of the carbon fibers as the component [A] was confirmed in a range within 7% of the average thickness of the prepreg from each surface of the prepreg.

(9) Evaluation of Abundance Ratio of Particles of Component [E] or Resin Particles Present in Range within 9% of Average Thickness of Prepreg from Each Surface of Prepreg The average thickness of the prepreg of the prepreg obtained in each Example and Comparative Example was measured by the method of (8) above. In this photograph of the cured prepreg, two lines parallel to the surface of the prepreg were drawn from both surfaces of the cured prepreg at a depth of 9% of the average thickness of the prepreg. The total area of the particles of the component [E] or the resin particles present between the surface of the prepreg and the parallel lines and the total area of all particles present over the thickness of the prepreg were obtained, and the abundance ratio of particles present in a depth range of 9% from the surface of the prepreg with respect to 100% of the thickness of the prepreg was calculated. Here, the total area of the particles was obtained by cutting the particle portions out of the cross-sectional photograph and converting from their mass.

(10) Volume Content (Vf) Measurement of Carbon Fibers in Prepreg

First, a carbon fiber mass per unit area was measured in accordance with the testing method of "Prepreg mass per unit area, and carbon fiber mass, resin mass content, and fiber mass content per unit area" described in JIS K7071 (1988). Specifically, a test piece of 100×100 mm was cut out from the prepreg obtained in each Example and Comparative Example, the thickness thereof was measured at arbitrary 5 spots, the average value thereof was taken as the average thickness, and the volume was calculated. Subsequently, at a temperature of 23° C., the test piece was put in a beaker, and about 200 ml of methyl ethyl ketone (MEK) was put therein, followed by 15-minutes agitation by ultrasonification. After filtering the supernatant liquid with a previously weighed glass filter, MEK was put in a beaker in which the carbon fibers as the component [A] remained, and the above operation was repeated three times. After completion of the third operation, the carbon fibers were also transferred to the glass filter and filtered by suction. After the filtration, the carbon fibers were dried together with the glass filter in a drier at a temperature of 105° C. for 90 minutes and then cooled in a desiccator for 45 minutes or more, followed by measuring the mass of the glass filter containing the carbon fibers, and a value obtained by subtracting the previously measured mass of the glass filter was taken as the mass of the carbon fibers. Using the density of the carbon fibers presented by the carbon fiber manufacturer, the volume was calculated from the carbon fiber mass obtained by the measurement. Vf was calculated by dividing the resulting volume of the carbon fibers by the volume of the test piece calculated first. The measurement was performed three times, and the average value was taken as Vf (% by volume) of the prepreg.

(11) Prepreg Abrasion Evaluation

The prepreg obtained in each Example and Comparative Example was cut into a size of 800 mm in the fiber direction and 6.35 mm in the direction perpendicular to the fiber, and the mass of the obtained prepreg test piece was measured with an electronic balance. Subsequently, it was abraded 700 mm over 5 seconds at an angle of 90° with respect to an end face of a 10 mm-thick aluminum plate chamfered to C0.1 while applying a load of 1.5 kg to the longitudinal end of the cut prepreg test piece. The mass of the abraded prepreg test piece was measured with the previous electronic balance, and a value obtained by calculating the percent change in mass by the following formula (1) was taken as the percent change in mass (%) of the prepreg test piece.

$$W0=(W1-W2)/W1\times 100 \qquad \text{Formula (1)}$$

W0: Percent change in mass (%)
W1: Prepreg mass before abrasion (g)
W2: Prepreg mass after abrasion (g).

(12) Evaluation of Stickiness of Prepreg

The prepreg obtained in each Example and Comparative Example is cut into a size of 800 mm in the fiber direction and 6.35 mm in the direction perpendicular to the fiber. Subsequently, in an environment of 35±2° C. and a relative humidity of 50±10%, according to JIS Z 0237 (2009), the cut prepreg test piece was pressure-bonded to a mirror-finished vertical plate made of SUS404 a total of two reciprocating, at a speed of 10 mm/s and stuck, using a 2 kg pressure roller (APR-97 manufactured by IMADA CO., LTD.). The state of peeling of the prepreg test piece after 1 hour was evaluated, and the case where the prepreg test piece was not peeled off from the plate was determined as "o", and the case where even a part was peeled off was determined as "x", respectively.

(13) Method for Measuring Open Type (Mode 1) Interlaminar Fracture Toughness ($G_{Ic}$) of Fiber-Reinforced Composite Material The carbon fibers contained in the prepreg obtained in each Example and Comparative Example were arranged in the same direction and laminated with 12 plies, and in order to prepare an initial crack, a two-fold PTFE film with a thickness of 0.015 mm was arranged between 6th ply and 7th ply. The laminated prepreg was covered with a nylon film so that there was no gap, heated up to 180° C. at a temperature elevation rate of 1.5° C./min in an autoclave, and then cured by heating and pressurizing at a temperature of 180° C. and a pressure of 700 kPa for 2 hours. Defining the carbon fiber direction (0°) as the length direction, a test piece was cut out into a width of 25 mm and a length of 250 mm, and according to JIS K 7086 (1993), a block for pin loading (length 25 mm, made of aluminum) was adhered to one end of the test piece (film-sandwiched side). A white paint was applied to both surface sides of the test piece to facilitate observation of crack growth, and the test was performed using an Instron universal testing machine (manufactured by Instron) according to JIS K 7086 (1993) Annex 1. The crosshead speed was set to 0.5 m/min until the crack growth reached 20 mm, and 1 mm/min after reaching 20 mm. According to JIS K 7086 (1993), the open type (mode 1) interlaminar fracture toughness ($G_{Ic}$) was calculated from the load, displacement, and crack length. The number of test pieces measured was 5, and the average value was taken as $G_{Ic}$.

(14) Method for Measuring Compression after Impact (CAI) of Fiber-Reinforced Composite Material The longitudinal direction of the carbon fibers contained in the prepreg obtained in each Example and Comparative Example was defined as 0°, and items prepared by repeating a base of [+45°/0°/−45°/90°] three times were laminated symmetrically to form a quasi-isotropic preliminary laminate with 24 plies in total. The resulting preliminary laminate was set in an autoclave, heated from room temperature to a temperature of 180° C. at a rate of 1.7° C. per minute under a pressure of 0.6 MPa, and cured at a temperature of 180° C. over 2 hours to obtain a fiber-reinforced composite material. From the obtained fiber-reinforced composite material, a rectangular test piece of 150 mm length×100 mm width was cut out. A drop-weight impact of 6.7 J per 1 mm thickness of the test piece was applied at the center of each test piece, according to JIS K 7089 (1996), and the residual compression was measured according to JIS K 7089 (1996). The measurement was performed 6 times, and the average value was taken as the compression after impact (CAI) (MPa).

(15) Method for Measuring in-Plane Shear Modulus (IPSM) of Fiber-Reinforced Composite Material The longitudinal direction of the carbon fibers contained in the prepreg obtained in each Example and Comparative Example was defined as 0°, and items prepared by repeating a base of [+45°/−45°] twice were laminated symmetrically to form a laminate with 8 plies in total. The resulting preliminary laminate was set in an autoclave, heated from room temperature to a temperature of 180° C. at a rate of 1.7° C. per minute under a pressure of 0.6 MPa, and cured at a temperature of 180° C. over 2 hours to obtain a fiber-reinforced composite material. From the obtained fiber-reinforced composite material, a rectangular test piece of 230 mm length×25 mm width was cut out, and the in-plane shear modulus was measured according to JIS K 7019 (1999).

(16) Measurement of Glass Transition Temperature (Tg) of Fiber-Reinforced Composite Material The carbon fibers contained in the prepreg obtained in each Example and Comparative Example were arranged in the same direction and laminated with 8 plies. The resulting preliminary laminate was set in an autoclave, heated from room temperature to a temperature of 180° C. at a rate of 1.7° C. per minute under a pressure of 0.6 MPa, and cured at a temperature of 180° C. over 2 hours to obtain a fiber-reinforced composite material. From the obtained fiber-reinforced composite material, a short test piece of 50 mm length×12 mm width was cut out, and exposed to methyl ethyl ketone (MEK) for 7 days. After exposure, the test piece was measured within 1 hour after taken out, using a dynamic viscoelasticity measuring device ARES-G2 (manufactured by TA Instruments) according to JIS K 7095 (2012). The value of the intersection temperature of a tangent in the glass state and a tangent in the transition state in a temperature-storage modulus G' curve obtained at a temperature elevation rate of 5° C./min and a frequency of 1 Hz was taken as Tg.

Example 1

A prepreg was prepared by the following method.
(Preparation of Second Resin Composition)
The following raw materials were kneaded using a kneader to prepare a second resin composition.
Component [B]
"SUMI-EPDXY (registered trademark)" ELM434 (manufactured by Sumitomo Chemical Co., Ltd.) 90% by mass
(Viscosity at 25° C.: 2.2×10$^4$ mPa·s)
"EPICLON (registered trademark)" 830 (manufactured by DIC Corporation) 10% by mass
Component [C]
3,3'-DAS (manufactured by Konishi Chemical Ind. Co., Ltd.) 35% by mass
Component [D]
"SUMIKAEXCEL (registered trademark)" PES5003P (manufactured by Sumitomo Chemical Co., Ltd.) 10% by mass.

Further, as a result of measuring the viscosity according to "(6) Complex Viscoelastic Modulus Measurement of Epoxy Resin Composition" in the various evaluation methods described above, the complex viscosity η* at a temperature of 80° C. was 14 Pa·s.

(Preparation of First Resin Composition)

The following raw materials were kneaded using a kneader to prepare a first resin composition.

Component [B]

"SUMI-EPDXY (registered trademark)" ELM434 (manufactured by Sumitomo Chemical Co., Ltd.) 90% by mass (Viscosity at 25° C.: $2.2×10^4$ mPa·s)

"EPICLON (registered trademark)" 830 (manufactured by DIC Corporation) 10% by mass Component [C]

3,3'-DAS (manufactured by Konishi Chemical Ind. Co., Ltd.) 66% by mass

Component [D]

"SUMIKAEXCEL (registered trademark)" PES5003P (manufactured by Sumitomo Chemical Co., Ltd.) 25% by mass.

Component [E]

Epoxy-modified nylon particles A (number average particle size: 13 μm) 80% by mass (Content ratio of thermoplastic resin to thermosetting resin: 90:10)

(Glass transition temperature: 172° C., tensile elongation at break: 20%)

(Number of cracks generated after MEK boiling reflux for 24 hours: 0).

Further, as a result of measuring the viscosity according to "(6) Complex Viscoelastic Modulus Measurement of Epoxy Resin Composition" in the various evaluation methods described above, viscosity at a temperature of 80° C. was $1.4×10^3$ Pa·s.

Furthermore, as a result of measuring the loss tangent tan δ according to "(7) Measurement of Loss Tangent tan δ of Epoxy Resin Composition" in the various evaluation methods described above, the minimum value of the loss tangent tan δ at 12 to 25° C. was 0.2, which satisfied the condition (V) of the present invention. Further, the maximum value of the loss tangent tan δ at 25 to 45° C. was 2.4.

The content of the component [C] is an amount such that the molar ratio of the number of active hydrogens of the component [C] to the number of epoxy groups in the component [B] is 1.3.

(Preparation of Prepreg)

The second resin composition obtained above was applied onto a release paper using a knife coater to prepare two resin films 1 with a resin basis weight of 39.5 g/m². Similarly, the first resin composition obtained above was applied onto a release paper to prepare two resin films 2 with a resin basis weight of 29.0 g/m².

Next, two sheets of the obtained resin film 1 were stacked on carbon fibers as the component [A] arranged in parallel along one direction so as to form a sheet with a fiber basis weigh of 268 g/m², from both sides of the carbon fibers. The laminate was impregnated with the epoxy resin composition by heating and pressuring under conditions of a maximum temperature of 145° C. and a maximum pressure of 1 MPa to obtain a prepreg precursor.

Two resin films 2 were stacked on the obtained prepreg precursor from both sides of the prepreg precursor, and heated and pressurized under conditions of a maximum temperature of 145° C. and a maximum pressure of 1 MPa to obtain a prepreg.

(Evaluation of Prepreg Properties)

As a result of measuring Vf of the obtained prepreg according to "(10) Volume Content (Vf) Measurement of Carbon Fibers in Prepreg" in the various evaluation methods described above, the Vf was 63% by volume, which was suitable for structural members.

Regarding the obtained prepreg, an evaluation of the components present in a range within 7% of the average thickness of the prepreg from each surface of the prepreg was performed according to "(8) Evaluation of Components Present in Range within 7% of Average Thickness of Prepreg from Each Surface of Prepreg" in the various evaluation methods described above. As a result, the component [A] was not contained in the range within 7% of the average thickness of the prepreg from each surface of the prepreg. In addition, the abundance ratio of particles of the component [E] present in a range within 9% of the average thickness of the prepreg from each surface of the prepreg was performed according to "(9) Evaluation of Abundance Ratio of Particles of Constituent [E] or Resin Particles Present in Range Within 9% of Average Thickness of Prepreg from Each Surface of Prepreg" in the various evaluation methods described above. As a result, the component [E] present in the range within 9% of the average thickness of the prepreg from each surface of the prepreg was 95% by mass with respect to the total amount of the component [E].

Regarding the obtained prepreg, as a result of performing the abrasion rate of the prepreg according to "(11) Prepreg Abrasion Evaluation" in the various evaluation methods described above, the percent change in mass from the prepreg test piece before measurement was 0.01%. In addition, as a result of evaluation according to "(12) Evaluation of Stickiness of Prepreg" in the various evaluation methods described above, the prepreg test piece was not peeled off from the plate, and thus the stickiness was good.

(Evaluation of Fiber-Reinforced Composite Material Properties)

Using the obtained prepreg, as a result of performing $G_{Ic}$ measurement and CAI measurement of the panel obtained by preparing the fiber-reinforced composite material according to "(13) Method for Measuring Open Type (Mode 1) Interlaminar Fracture Toughness ($G_{Ic}$) of Fiber-Reinforced Composite Material" and "(14) Method for Measuring Compression after Impact (CAI) of Fiber-Reinforced Composite Material" in the various evaluation methods described above, $G_{Ic}$ was as high as 455 J/m², and CAI was as high as 387 MPa.

Examples 2 to 15

The first resin composition and the second resin composition were prepared in the same manner as in Example 1, except for changing the composition of the first resin composition as shown in Table 1 and Table 2, and prepregs were obtained by the two-stage impregnation hot-melt process, then, fiber-reinforced composite materials were prepared and subjected to various evaluations. The second resin composition was the same as in Example 1.

The results of various measurements are as shown in Table 1 and Table 2, there was no problem in resin properties and prepreg properties even if the blending ratio was varied within a specific range, and fiber-reinforced composite materials having excellent impact resistance were obtained.

Example 16

The first resin composition and the second resin composition were prepared in the same manner as in Example 1, except for changing the composition of the first resin composition as shown in Table 2, and a prepreg was obtained by the two-stage impregnation hot-melt process, then, a fiber-reinforced composite material was prepared and subjected to various evaluations. The second resin composition was the same as in Example 1.

The results of various measurements are as shown in Table 2, there was no problem in resin properties and prepreg properties, and a fiber-reinforced composite material having excellent impact resistance was obtained. However, the maximum value of tan δ at 25 to 45° C. was as low as 2.0, and the evaluation of stickiness of the prepreg was poor.

Comparative Examples 1 to 12

The first resin composition and the second resin composition were prepared in the same manner as in Example 1, except for changing the composition of the first resin composition as shown in Table 3, and a prepreg was obtained by the two-stage impregnation hot-melt process, then, a fiber-reinforced composite material was prepared and subjected to various evaluations. The second resin composition was the same as in Example 1.

Comparing Example 1 and Comparative Example 1, since an epoxy resin having a viscosity at 25° C. of $2.0 \times 10^4$ mPa·s or more is less than 80% by mass in Comparative Example 1, it can be seen that the minimum value of tan δ at 12 to 25° C. of the obtained first resin composition is as high as 1.2, and also the abrasion rate (the percent change in mass of the test piece) of the prepreg is 0.38%, indicating that the resin is likely to adhere.

Since Comparative Examples 2 to 5 use a different material from the component [E] defined in the present invention as the resin particles, for example, when compared with Example 1, it can be seen that fiber-reinforced composite material properties such as CAI, $G_{Ic}$, and IPSM are inferior.

In Comparative Examples 6 and 7, the molar ratio of the number of active hydrogens in the component [C] to the number of epoxy groups in the component [B] is outside the range defined in the present invention. Therefore, it can be seen that when the molar ratio is small, the minimum value of tan δ at 12 to 25° C. exceeds 1.0, and when the molar ratio is large, the complex viscosity η* is outside the range defined in the present invention and the Tg of the fiber-reinforced composite material becomes low.

In Comparative Examples 8 and 9, since the content of the resin particles (component [E]) is outside the definition of the present invention, it can be seen that when the content is low, the CAI of the obtained fiber-reinforced composite material is low, and when the content is high, the complex viscosity η* is outside the range defined in the present invention.

In Comparative Examples 10 and 11, since the content of the component [D] is outside the definition of the present invention, it can be seen that when the content is low, the complex viscosity η* is low, the minimum value of tan δ at 12 to 25° C. of the obtained first resin composition is as high as 1.5, and also the abrasion rate (the percent change in mass of the test piece) of the prepreg is 0.41%, indicating that the resin is likely to adhere. It can be seen that when the content is high, the complex viscosity η* is outside the range defined in the present invention.

In Comparative Example 12, since the amount of the component [E] present in a range within 9% from each surface of the prepreg is 83%, which is outside the defined range of this patent, it can be seen that the CAI of the obtained fiber-reinforced composite material is low, and the impact resistance is poor.

TABLE 1

| | Item | Unit | Example 1 | Example 2 | Example 3 | Example 4 |
|---|---|---|---|---|---|---|
| Component [B] | "SUMI-EPOXY (registered trademark)" ELM434 (Viscosity at 25° C.: $2.2 \times 10^4$ mPa·s) | % by mass | 90 | 90 | 100 | 80 |
| | "SUMI-EPOXY (registered trademark)" ELM120 (Viscosity at 25° C.: $2.0 \times 10^4$ mPa·s) | % by mass | 0 | 0 | 0 | 0 |
| | "EPICLON (registered trademark)" HP-4032 (Viscosity at 25° C.: $2.4 \times 10^4$ mPa·s) | % by mass | 0 | 0 | 0 | 0 |
| | "EPICLON (registered trademark)" 830 (Viscosity at 25° C.: 3500 mPa·s) | % by mass | 10 | 10 | 0 | 20 |
| | GAN (Viscosity at 25° C.: 130 mPa·s) | % by mass | 0 | 0 | 0 | 0 |
| Component [C] | 3,3'-DAS | % by mass | 66 | 35 | 68 | 49 |
| | "SEICACURE (registered trademark)" S | % by mass | 0 | 0 | 0 | 0 |
| Component [D] | "SUMIKAEXCEL (registered trademark)" PES5003P | % by mass | 25 | 25 | 25 | 25 |
| | "VIRANTAGE (trademark registration)" VW-10700RFP | % by mass | 0 | 0 | 0 | 0 |
| Component [E] | Epoxy-modified nylon particles A (Number average particle size: 13 μm) | % by mass | 80 | 80 | 80 | 80 |
| Resin particles other than component [E] | "Grilamid (registered trademark)" TR-55 particles (Average particle size: 13 μm) | % by mass | 0 | 0 | 0 | 0 |
| | Nylon fine particles SP-10 (average particle size: 10 μm) | % by mass | 0 | 0 | 0 | 0 |
| | "Torlon (registered trademark)" 4203L (average particle size: 15 μm) | % by mass | 0 | 0 | 0 | 0 |
| | Polycarbonate particles (average particle size: 13 μm) | % by mass | 0 | 0 | 0 | 0 |

TABLE 1-continued

| | | | | | | |
|---|---|---|---|---|---|---|
| Molar ratio of number of active hydrogens in component [C] to number of epoxy groups in component [B] | | — | 1.3 | 0.7 | 1.3 | 1.0 |
| Physical properties of component [B] or epoxy resin | Complex viscosity η* at 25° C. | mPa·s | $2.2 \times 10^4$ | $2.2 \times 10^4$ | $2.2 \times 10^4$ | $2.2 \times 10^4$ |
| Physical properties of component [E] or resin particles | Content ratio of thermoplastic resin and thermosetting resin | % by mass | 90:10 | 90:10 | 90:10 | 90:10 |
| | Number average particle size | μm | 13 | 13 | 13 | 13 |
| | Glass transition temperature | ° C. | 172 | 172 | 172 | 172 |
| | Tensile elongation at break | % | ≥20 | ≥20 | ≥20 | ≥20 |
| | Number of cracks generated after MEK boiling reflux for 24 hours | number | 0 | 0 | 0 | 0 |
| First resin composition | Complex viscosity η* at 80° C. | Pa·s | $1.4 \times 10^3$ | $1.1 \times 10^3$ | $1.4 \times 10^3$ | $1.3 \times 10^3$ |
| | Minimum value of tan δ at 12 to 25° C. | — | 0.2 | 0.3 | 0.2 | 0.4 |
| | Maximum value of tan δ at 25 to 45° C. | — | 2.4 | 2.6 | 2.2 | 2.3 |
| Second resin composition | Complex viscosity η* at 80° C. | Pa·s | 14 | 13 | 13 | 14 |
| Prepreg properties | Fiber deposit content (Vf) | % by volume | 63 | 60 | 61 | 61 |
| | Abrasion rate (test piece mass change rate) | % | 0.01 | 0.03 | 0.01 | 0.03 |
| | Range from each surface of prepreg in which first resin composition is present | % | 7 | 7 | 7 | 7 |
| | Amount of component [E] present within 9% from each surface of prepreg | % by mass | 95 | 91 | 96 | 93 |
| | Stickiness of prepreg | — | ○ | ○ | ○ | ○ |
| Fiber-reinforced composite material properties | $G_{Ic}$ | J/m² | 455 | 464 | 453 | 446 |
| | CAI | MPa | 387 | 376 | 391 | 381 |
| | IPSM (MEK 7 days immersion) | GPa | 4.3 | 4.1 | 4.2 | 4.1 |
| | CM-Tg (DMA) | ° C. | 202 | 198 | 201 | 196 |

| | Item | Unit | Example 5 | Example 6 | Example 7 | Example 8 |
|---|---|---|---|---|---|---|
| Component [B] | "SUMI-EPOXY (registered trademark)" ELM434 (Viscosity at 25° C.: $2.2 \times 10^4$ mPa·s) | % by mass | 80 | 80 | 80 | 80 |
| | "SUMI-EPOXY (registered trademark)" ELM120 (Viscosity at 25° C.: $2.0 \times 10^4$ mPa·s) | % by mass | 0 | 0 | 0 | 0 |
| | "EPICLON (registered trademark)" HP-4032 (Viscosity at 25° C.: $2.4 \times 10^4$ mPa·s) | % by mass | 0 | 0 | 0 | 0 |
| | "EPICLON (registered trademark)" 830 (Viscosity at 25° C.: 3500 mPa·s) | % by mass | 20 | 20 | 20 | 20 |
| | GAN (Viscosity at 25° C.: 130 mPa·s) | % by mass | 0 | 0 | 0 | 0 |
| Component [C] | 3,3'-DAS | % by mass | 49 | 49 | 49 | 0 |
| | "SEICACURE (registered trademark)" S | % by mass | 0 | 0 | 0 | 49 |
| Component [D] | "SUMIKAEXCEL (registered trademark)" PES5003P | % by mass | 15 | 25 | 20 | 20 |
| | "VIRANTAGE (trademark registration)" VW-10700RFP | % by mass | 0 | 0 | 0 | 0 |
| Component [E] | Epoxy-modified nylon particles A (Number average particle size: 13 μm) | % by mass | 80 | 50 | 80 | 80 |
| Resin particles other than component [E] | "Grilamid (registered trademark)" TR-55 particles (Average particle size: 13 μm) | % by mass | 0 | 0 | 0 | 0 |
| | Nylon fine particles SP-10 (average particle size: 10 μm) | % by mass | 0 | 0 | 0 | 0 |
| | "Torlon (registered trademark)" 4203L (average particle size: 15 μm) | % by mass | 0 | 0 | 0 | 0 |
| | Polycarbonate particles (average particle size: 13 μm) | % by mass | 0 | 0 | 0 | 0 |
| Molar ratio of number of active hydrogens in component [C] to number of epoxy groups in component [B] | | — | 1.0 | 1.0 | 1.0 | 1.0 |
| Physical properties of component [B] or epoxy resin | Complex viscosity η* at 25° C. | mPa·s | $2.2 \times 10^4$ | $2.2 \times 10^4$ | $2.2 \times 10^4$ | $2.2 \times 10^4$ |
| Physical properties of component [E] or resin particles | Content ratio of thermoplastic resin and thermosetting resin | % by mass | 90:10 | 90:10 | 90:10 | 90:10 |
| | Number average particle size | μm | 13 | 13 | 13 | 13 |
| | Glass transition temperature | ° C. | 172 | 172 | 172 | 172 |
| | Tensile elongation at break | % | ≥20 | ≥20 | ≥20 | ≥20 |
| | Number of cracks generated after MEK boiling reflux for 24 hours | number | 0 | 0 | 0 | 0 |
| First resin composition | Complex viscosity η* at 80° C. | Pa·s | $3.0 \times 10^2$ | $1.0 \times 10^3$ | $1.2 \times 10^3$ | $1.2 \times 10^3$ |
| | Minimum value of tan δ at 12 to 25° C. | — | 1.0 | 0.6 | 0.8 | 0.7 |
| | Maximum value of tan δ at 25 to 45° C. | — | 3.2 | 3.3 | 3.3 | 2.2 |

TABLE 1-continued

| | | | | | | |
|---|---|---|---|---|---|---|
| Second resin composition | Complex viscosity η* at 80° C. | Pa · s | 13 | 17 | 15 | 15 |
| Prepreg properties | Fiber deposit content (Vf) | % by volume | 58 | 60 | 59 | 55 |
| | Abrasion rate (test piece mass change rate) | % | 0.08 | 0.05 | 0.05 | 0.07 |
| | Range from each surface of prepreg in which first resin composition is present | % | 7 | 7 | 7 | 7 |
| | Amount of component [E] present within 9% from each surface of prepreg | % by mass | 92 | 92 | 90 | 91 |
| | Stickiness of prepreg | — | ○ | ○ | ○ | ○ |
| Fiber-reinforced composite material properties | $G_{Ic}$ | J/m² | 425 | 431 | 429 | 439 |
| | CAI | MPa | 383 | 305 | 375 | 342 |
| | IPSM (MEK 7 days immersion) | GPa | 4.2 | 4.2 | 4.2 | 4.2 |
| | CM-Tg (DMA) | ° C. | 200 | 202 | 198 | 199 |

Note:
The content (% by mass) of the component [C], the component [D], and the component [E] is a value when the mass of the component [B] is 100% by mass. The content of the component [C] is such that the molar ratio of the number of active hydrogens of the component [C] to the number of epoxy groups in the component [B] is the above value.

TABLE 2

| | Item | Unit | Example 9 | Example 10 | Example 11 | Example 12 |
|---|---|---|---|---|---|---|
| Component [B] | "SUMI-EPOXY (registered trademark)" ELM434 (Viscosity at 25° C.: 2.2 × 10⁴ mPa · s) | % by mass | 90 | 90 | 100 | 80 |
| | "SUMI-EPOXY (registered trademark)" ELM120 (Viscosity at 25° C.: 2.0 × 10⁴ mPa · s) | % by mass | 0 | 0 | 0 | 0 |
| | "EPICLON (registered trademark)" HP-4032 (Viscosity at 25° C.: 2.4 × 10⁴ mPa · s) | % by mass | 0 | 0 | 0 | 0 |
| | "EPICLON (registered trademark)" 830 (Viscosity at 25° C.: 3500 mPa · s) | % by mass | 10 | 10 | 0 | 20 |
| | GAN (Viscosity at 25° C.: 130 mPa · s) | % by mass | 0 | 0 | 0 | 0 |
| Component [C] | 3,3'-DAS | % by mass | 66 | 49 | 49 | 49 |
| | "SEICACURE (registered trademark)" S | % by mass | 0 | 0 | 0 | 0 |
| Component [D] | "SUMIKAEXCEL (registered trademark)" PES5003P | % by mass | 25 | 25 | 25 | 25 |
| | "VIRANTAGE (trademark registration)" VW-10700RFP | % by mass | 0 | 0 | 0 | 0 |
| Component [E] | Epoxy-modified nylon particles A (Number average particle size: 13 μm) | % by mass | 80 | 80 | 80 | 65 |
| Resin particles other than component [E] | "Grilamid (registered trademark)" TR-55 particles (Average particle size: 13 μm) | % by mass | 0 | 0 | 0 | 0 |
| | Nylon fine particles SP-10 (average particle size: 10 μm) | % by mass | 0 | 0 | 0 | 0 |
| | "Torlon (registered trademark)" 4203L (average particle size: 15 μm) | % by mass | 0 | 0 | 0 | 0 |
| | Polycarbonate particles (average particle size: 13 μm) | % by mass | 0 | 0 | 0 | 0 |
| Molar ratio of number of active hydrogens in component [C] to number of epoxy groups in component [B] | | — | 1.3 | 0.9 | 1.2 | 1.0 |
| Physical properties of component [B] or epoxy resin | Complex viscosity η* at 25° C. | mPa · s | 2.2 × 10⁴ | 2.0 × 10⁴ | 2.4 × 10⁴ | 2.2 × 10⁴ |
| Physical properties of component [E] or resin particles | Content ratio of thermoplastic resin and thermosetting resin | % by mass | 90:10 | 90:10 | 90:10 | 90:10 |
| | Number average particle size | μm | 13 | 13 | 13 | 13 |
| | Glass transition temperature | ° C. | 172 | 172 | 172 | 172 |
| | Tensile elongation at break | % | ≥20 | ≥20 | ≥20 | ≥20 |
| | Number of cracks generated after MEK boiling reflux for 24 hours | number | 0 | 0 | 0 | 0 |
| First resin composition | Complex viscosity η* at 80° C. | Pa · s | 1.1 × 10³ | 1.0 × 10³ | 1.5 × 10³ | 1.0 × 10³ |
| | Minimum value of tan δ at 12 to 25° C. | — | 0.2 | 0.6 | 0.4 | 0.6 |
| | Maximum value of tan δ at 25 to 45° C. | — | 2.4 | 3.1 | 2.6 | 2.9 |
| Second resin composition | Complex viscosity η* at 80° C. | Pa · s | 10 | 15 | 15 | 17 |
| Prepreg properties | Fiber deposit content (Vf) | % by volume | 63 | 60 | 59 | 60 |
| | Abrasion rate (test piece mass change rate) | % | 0.01 | 0.05 | 0.02 | 0.05 |
| | Range from each surface of prepreg in which first resin composition is present | % | 7 | 7 | 7 | 7 |
| | Amount of component [E] present within 9% from each surface of prepreg | % by mass | 85 | 86 | 87 | 91 |
| | Stickiness of prepreg | — | ○ | ○ | ○ | ○ |

TABLE 2-continued

| | | | | | | |
|---|---|---|---|---|---|---|
| Fiber-reinforced composite material properties | $G_{Ic}$ | J/m² | 443 | 413 | 426 | 445 |
| | CAI | MPa | 305 | 315 | 325 | 395 |
| | IPSM (MEK 7 days immersion) | GPa | 4.3 | 4.2 | 4.1 | 4.2 |
| | CM-Tg (DMA) | °C. | 202 | 195 | 203 | 202 |

| Item | | Unit | Example 13 | Example 14 | Example 15 | Example 16 |
|---|---|---|---|---|---|---|
| Component [B] | "SUMI-EPOXY (registered trademark)" ELM434 (Viscosity at 25° C.: 2.2 × 10⁴ mPa · s) | % by mass | 80 | 80 | 80 | 80 |
| | "SUMI-EPOXY (registered trademark)" ELM120 (Viscosity at 25° C.: 2.0 × 10⁴ mPa · s) | % by mass | 0 | 0 | 0 | 0 |
| | "EPICLON (registered trademark)" HP-4032 (Viscosity at 25° C.: 2.4 × 10⁴ mPa · s) | % by mass | 0 | 0 | 0 | 0 |
| | "EPICLON (registered trademark)" 830 (Viscosity at 25° C.: 3500 mPa · s) | % by mass | 20 | 20 | 20 | 20 |
| | GAN (Viscosity at 25° C.: 130 mPa · s) | % by mass | 0 | 0 | 0 | 0 |
| Component [C] | 3,3'-DAS | % by mass | 49 | 64 | 34 | 49 |
| | "SEICACURE (registered trademark)" S | % by mass | 0 | 0 | 0 | 0 |
| Component [D] | "SUMIKAEXCEL (registered trademark)" PES5003P | % by mass | 25 | 25 | 25 | 25 |
| | "VIRANTAGE (trademark registration)" VW-10700RFP | % by mass | 0 | 0 | 0 | 0 |
| Component [E] | Epoxy-modified nylon particles A (Number average particle size: 13 μm) | % by mass | 75 | 80 | 80 | 80 |
| Resin particles other than component [E] | "Grilamid (registered trademark)" TR-55 particles (Average particle size: 13 μm) | % by mass | 0 | 0 | 0 | 0 |
| | Nylon fine particles SP-10 (average particle size: 10 μm) | % by mass | 0 | 0 | 0 | 0 |
| | "Torlon (registered trademark)" 4203L (average particle size: 15 μm) | % by mass | 0 | 0 | 0 | 0 |
| | Polycarbonate particles (average particle size: 13 μm) | % by mass | 0 | 0 | 0 | 0 |
| Molar ratio of number of active hydrogens in component [C] to number of epoxy groups in component [B] | | — | 1.0 | 1.3 | 0.7 | 1.0 |
| Physical properties of component [B] or epoxy resin | Complex viscosity η* at 25° C. | mPa · s | 2.2 × 10⁴ | 2.2 × 10⁴ | 2.2 × 10⁴ | 2.4 × 10⁴ |
| Physical properties of component [E] or resin particles | Content ratio of thermoplastic resin and thermosetting resin | % by mass | 90:10 | 90:10 | 90:10 | 90:10 |
| | Number average particle size | μm | 13 | 13 | 13 | 13 |
| | Glass transition temperature | °C. | 172 | 172 | 172 | 172 |
| | Tensile elongation at break | % | ≥20 | ≥20 | ≥20 | ≥20 |
| | Number of cracks generated after MEK boiling reflux for 24 hours | number | 0 | 0 | 0 | 0 |
| First resin composition | Complex viscosity η* at 80° C. | Pa · s | 1.0 × 10³ | 1.4 × 10³ | 1.1 × 10³ | 1.5 × 10³ |
| | Minimum value of tan δ at 12 to 25° C. | — | 0.4 | 0.2 | 0.3 | 0.3 |
| | Maximum value of tan δ at 25 to 45° C. | — | 2.5 | 2.4 | 2.6 | 2.0 |
| Second resin composition | Complex viscosity η* at 80° C. | Pa · s | 17 | 14 | 13 | 14 |
| Prepreg properties | Fiber deposit content (Vf) | % by volume | 60 | 63 | 60 | 60 |
| | Abrasion rate (test piece mass change rate) | % | 0.05 | 0.01 | 0.03 | 0.02 |
| | Range from each surface of prepreg in which first resin composition is present | % | 7 | 7 | 7 | 7 |
| | Amount of component [E] present within 9% from each surface of prepreg | % by mass | 95 | 95 | 91 | 91 |
| | Stickiness of prepreg | — | ○ | ○ | ○ | x |
| Fiber-reinforced composite material properties | $G_{Ic}$ | J/m² | 454 | 455 | 464 | 442 |
| | CAI | MPa | 394 | 387 | 376 | 323 |
| | IPSM (MEK 7 days immersion) | GPa | 4.2 | 4.3 | 4.1 | 4.2 |
| | CM-Tg (DMA) | °C. | 202 | 202 | 200 | 200 |

Note:
The content (% by mass) of the component [C], the component [D], and the component [E] is a value when the mass of the component [B] is 100% by mass. The content of the component [C] is such that the molar ratio of the number of active hydrogens of the component [C] to the number of epoxy groups in the component [B] is the above value.

TABLE 3

| Item | | Unit | Comparative Example 1 | Comparative Example 2 | Comparative Example 3 | Comparative Example 4 | Comparative Example 5 | Comparative Example 6 |
|---|---|---|---|---|---|---|---|---|
| Component [B] | "SUMI-EPOXY (registered trademark)" ELM434 (Viscosity at 25° C.: 2.2 × 10$^4$ mPa·s) | % by mass | 90 | 90 | 100 | 80 | 80 | 80 |
| | "SUMI-EPOXY (registered trademark)" ELM120 (Viscosity at 25° C.: 2.0 × 10$^4$ mPa·s) | % by mass | 0 | 0 | 0 | 0 | 0 | 0 |
| | "EPICLON (registered trademark)" HP-4032 (Viscosity at 25° C.: 2.4 × 10$^4$ mPa·s) | % by mass | 0 | 0 | 0 | 0 | 0 | 0 |
| | "EPICLON (registered trademark)" 830 (Viscosity at 25° C.: 3500 mPa·s) | % by mass | 10 | 10 | 0 | 20 | 20 | 20 |
| | GAN (Viscosity at 25° C.: 130 mPa·s) | % by mass | 0 | 0 | 0 | 0 | 0 | 0 |
| Component [C] | 3,3'-DAS | % by mass | 0 | 50 | 52 | 49 | 49 | 29 |
| | "SEICACURE (registered trademark)" S | % by mass | 59 | 0 | 0 | 0 | 0 | 0 |
| Component [D] | "SUMIKAEXCEL (registered trademark)" PES5003P | % by mass | 0 | 25 | 25 | 25 | 25 | 25 |
| | "VIRANTAGE (trademark registration)" VW-10700RFP | % by mass | 33 | 0 | 0 | 0 | 0 | 0 |
| Component [E] | Epoxy-modified nylon particles A (Number average particle size: 13 μm) | % by mass | 0 | 0 | 0 | 0 | 0 | 80 |
| Resin particles other than component [E] | "Grilamid (registered trademark)" TR-55 particles (Average particle size: 13 μm) | % by mass | 70 | 80 | 0 | 0 | 0 | 0 |
| | Nylon fine particles SP-10 (average particle size: 10 μm) | % by mass | 0 | 0 | 80 | 0 | 0 | 0 |
| | "Torlon (registered trademark)" 4203L (average particle size: 15 μm) | % by mass | 0 | 0 | 0 | 80 | 0 | 0 |
| | Polycarbonate particles (average particle size: 13 μm) | % by mass | 0 | 0 | 0 | 0 | 80 | 0 |
| Molar ratio of number of active hydrogens in component [C] to number of epoxy groups in component [B] | | — | — | — | 1.0 | 1.0 | 1.0 | 1.0 | 0.6 |
| Physical properties of component [B] or epoxy resin | Complex viscosity η* at 25° C. | mPa·s | 2.2 × 10$^4$ | 2.2 × 10$^4$ | 2.2 × 10$^4$ | 2.2 × 10$^4$ | 2.2 × 10$^4$ | 2.2 × 10$^4$ |
| Physical properties of component [E] or resin particles | Content ratio of thermoplastic resin and thermosetting resin | % by mass | — | — | — | — | — | 90:10 |
| | Number average particle size | μm | 13 | 60 | 10 | 15 | 10 | 13 |
| | Glass transition temperature | ° C. | 160 | 160 | 168 | 275 | 250 | 172 |
| | Tensile elongation at break | % | ≥20 | ≥20 | ≥20 | 7.6 | ≥20 | ≥20 |
| | Number of cracks generated after MEK boiling reflux for 24 hours | number | 4 | 4 | 13 | 21 | 53 | 0 |
| First resin composition | Complex viscosity η* at 80° C. | Pa·s | 2.9 × 10$^2$ | 1.2 × 10$^3$ | 1.2 × 10$^3$ | 1.2 × 10$^3$ | 1.2 × 10$^3$ | 1.0 × 10$^3$ |
| | Minimum value of tan δ at 12 to 25° C. | — | 1.2 | 0.3 | 0.3 | 0.3 | 0.3 | 1.2 |
| | Maximum value of tan δ at 25 to 45° C. | — | 3.6 | 2.6 | 2.6 | 2.7 | 2.6 | 3.4 |
| Second resin composition | Complex viscosity η* at 80° C. | Pa·s | 14 | 15 | 13 | 10 | 17 | 15 |
| Prepreg properties | Fiber deposit content (Vf) | % by volume | 55 | 59 | 60 | 60 | 59 | 56 |
| | Abrasion rate (test piece mass change rate) | % | 0.38 | 0.03 | 0.03 | 0.04 | 0.03 | 0.14 |
| | Range from each surface of prepreg in which first resin composition is present | % | 9 | 7 | 7 | 7 | 7 | 7 |
| | Amount of component [E] present within 9% from each surface of prepreg | % by mass | 90 | 89 | 94 | 95 | 93 | 91 |
| | Stickiness of prepreg | — | ○ | ○ | ○ | ○ | ○ | ○ |
| Fiber-reinforced composite material properties | $G_{Ic}$ | J/m$^2$ | 443 | 540 | 485 | 329 | 483 | 454 |
| | CAI | MPa | 352 | 298 | 367 | 371 | 365 | 376 |
| | IPSM (MEK 7 days immersion) | GPa | 4.2 | 4.3 | 4.1 | 4.3 | 2.6 | 4.2 |
| | CM-Tg (DMA) | ° C. | 202 | 198 | 201 | 196 | 200 | 202 |

| Item | | Unit | Comparative Example 7 | Comparative Example 8 | Comparative Example 9 | Comparative Example 10 | Comparative Example 11 | Comparative Example 12 |
|---|---|---|---|---|---|---|---|---|
| Component [B] | "SUMI-EPOXY (registered trademark)" ELM434 (Viscosity at 25° C.: 2.2 × 10$^4$ mPa·s) | % by mass | 80 | 80 | 80 | 80 | 80 | 90 |
| | "SUMI-EPOXY (registered trademark)" ELM120 (Viscosity at 25° C.: 2.0 × 10$^4$ mPa·s) | % by mass | 0 | 0 | 0 | 0 | 0 | 0 |
| | "EPICLON (registered trademark)" HP-4032 (Viscosity at 25° C.: 2.4 × 10$^4$ mPa·s) | % by mass | 0 | 0 | 0 | 0 | 0 | 0 |
| | "EPICLON (registered trademark)" 830 (Viscosity at 25° C.: 3500 mPa·s) | % by mass | 20 | 20 | 20 | 20 | 20 | 10 |
| | GAN (Viscosity at 25° C.: 130 mPa·s) | % by mass | 0 | 0 | 0 | 0 | 0 | 0 |

TABLE 3-continued

| | | | | | | | | |
|---|---|---|---|---|---|---|---|---|
| Component [C] | 3,3'-DAS | % by mass | 68 | 49 | 49 | 49 | 49 | 50 |
| | "SEICACURE (registered trademark)" S | % by mass | 0 | 0 | 0 | 0 | 0 | 0 |
| Component [D] | "SUMIKAEXCEL (registered trademark)" PES5003P | % by mass | 25 | 25 | 25 | 10 | 40 | 25 |
| | "VIRANTAGE (trademark registration)" VW-10700RFP | % by mass | 0 | 0 | 0 | 0 | 0 | 0 |
| Component [E] | Epoxy-modified nylon particles A (Number average particle size: 13 μm) | % by mass | 80 | 40 | 90 | 80 | 80 | 80 |
| Resin particles other than component [E] | "Grilamid (registered trademark)" TR-55 particles (Average particle size: 13 μm) | % by mass | 0 | 0 | 0 | 0 | 0 | 0 |
| | Nylon fine particles SP-10 (average particle size: 10 μm) | % by mass | 0 | 0 | 0 | 0 | 0 | 0 |
| | "Torlon (registered trademark)" 4203L (average particle size: 15 μm) | % by mass | 0 | 0 | 0 | 0 | 0 | 0 |
| | Polycarbonate particles (average particle size: 13 μm) | % by mass | 0 | 0 | 0 | 0 | 0 | 0 |
| Molar ratio of number of active hydrogens in component [C] to number of epoxy groups in component [B] | | — | 1.4 | 1.0 | 1.0 | 1.0 | 1.0 | 1.0 |
| Physical properties of component [B] or epoxy resin | Complex viscosity $\eta^*$ at 25° C. | mPa·s | $2.2 \times 10^4$ | $2.2 \times 10^4$ | $2.2 \times 10^4$ | $2.2 \times 10^4$ | $2.2 \times 10^4$ | $2.2 \times 10^4$ |
| Physical properties of component [E] or resin particles | Content ratio of thermoplastic resin and thermosetting resin | % by mass | 90:10 | 90:10 | 90:10 | 90:10 | 90:10 | 90:10 |
| | Number average particle size | μm | 13 | 13 | 13 | 13 | 13 | 60 |
| | Glass transition temperature | ° C. | 172 | 172 | 172 | 172 | 172 | 160 |
| | Tensile elongation at break | % | ≥20 | ≥20 | ≥20 | ≥20 | ≥20 | ≥20 |
| | Number of cracks generated after MEK boiling reflux for 24 hours | number | 0 | 0 | 0 | 0 | 0 | 4 |
| First resin composition | Complex viscosity $\eta^*$ at 80° C. | Pa·s | $1.6 \times 10^3$ | $1.1 \times 10^3$ | $1.6 \times 10^3$ | $1.5 \times 10^2$ | $1.5 \times 10^4$ | $1.2 \times 10^3$ |
| | Minimum value of tan δ at 12 to 25° C. | — | 0.6 | 0.6 | 0.5 | 1.5 | 0.1 | 0.9 |
| | Maximum value of tan δ at 25 to 45° C. | — | 2.0 | 2.1 | 1.5 | 3.7 | 1.3 | 3.0 |
| Second resin composition | Complex viscosity $\eta^*$ at 80° C. | Pa·s | 14 | 14 | 13 | 13 | 15 | 15 |
| Prepreg properties | Fiber deposit content (Vf) | % by volume | 64 | 57 | 61 | 60 | 63 | 60 |
| | Abrasion rate (test piece mass change rate) | % | 0.01 | 0.04 | 0.02 | 0.41 | 0.01 | 0.06 |
| | Range from each surface of prepreg in which first resin composition is present | % | 7 | 7 | 7 | 7 | 7 | 7 |
| | Amount of component [E] present within 9% from each surface of prepreg | % by mass | 92 | 95 | 90 | 92 | 91 | 83 |
| | Stickiness of prepreg | — | x | x | x | ○ | x | ○ |
| Fiber-reinforced composite material properties | $G_{Ic}$ | J/m² | 439 | 440 | 442 | 421 | 452 | 512 |
| | CAI | MPa | 388 | 247 | 412 | 412 | 412 | 270 |
| | IPSM (MEK 7 days immersion) | GPa | 4.1 | 4.1 | 4.2 | 4.1 | 4.3 | 4.3 |
| | CM-Tg (DMA) | ° C. | 185 | 201 | 199 | 204 | 210 | 198 |

Note:
The content (% by mass) of the component [C], the component [D], and the component [E] is a value when the mass of the component [B] is 100% by mass. The content of the component [C] is such that the molar ratio of the number of active hydrogens of the component [C] to the number of epoxy groups in the component [B] is the above value.

INDUSTRIAL APPLICABILITY

The fiber-reinforced composite material obtainable from the prepreg of the present invention is excellent in strength, stiffness, and impact resistance, and for this reason, it can be used suitably for a wide variety of applications such as aerospace applications including primary structural members such as the fuselage, main wings, tail wings and floor beams of an aircraft, secondary structural materials such as flaps, ailerons, cowls, fairings and interior materials, rocket motor casings and an artificial satellite structural members, structural materials of moving bodies such as motor vehicles, ships and railway vehicles, building materials, blades of wind mills, and computer applications such as IC trays and housings of laptop computers.

The invention claimed is:

1. A prepreg comprising the following components [A] to [E], wherein 85% by mass or more of the component [E] is present in a range within 9% of an average thickness of the prepreg from each surface of the prepreg, a range within 7% of the average thickness of the prepreg from each surface of the prepreg is composed of a first resin composition containing the components [B] to [E], and the prepreg satisfies the following conditions (I) to (V):
   [A] a carbon fiber,
   [B] an epoxy resin having two or more glycidyl groups in one molecule,
   [C] an aromatic amine compound,
   [D] a thermoplastic resin having a polyarylether skeleton, and
   [E] particles wherein the particles
      have a number average particle size of primary particles of 5 to 50 μm,
      have a content ratio (% by mass) of thermoplastic resin and thermosetting resin of 95:5 to 70:30, and
      generate a crack having a size of 20 μm or less when the particle is immersed in methyl ethyl ketone and boiled and refluxed for 24 hours wherein the number of generated cracks is 5 or less;
   Condition (I): the component [B] contains 80% by mass or more of an epoxy resin having a viscosity at 25° C. of $2.0 \times 10^4$ mPa·s or more, Condition (II): a molar ratio of the number of active hydrogens in the component [C] to the number of epoxy groups in the component [B] is 0.7 to 1.3, Condition (III): the prepreg comprises 15 to 25% by mass of the component [D] with respect to 100% by mass of the component [B], Condition (IV): the prepreg comprises 50 to 80% by mass of the component [E] with respect to 100% by mass of the component [B], and Condition (V): a minimum value of loss tangent tanδ of the first resin composition in a temperature range of 12 to 25° C. is 1.0 or less.

2. The prepreg according to claim 1, wherein a maximum value of loss tangent tan δ of the first resin composition in a temperature range of 25° C. to 45° C. is 2.2 or more.

3. The prepreg according to claim 1, wherein the thermoplastic resin in the component [E] contains polyamide.

4. The prepreg according to claim 1, wherein the component [E] has a glass transition temperature of 170° C. or more.

5. The prepreg according to claim 1, wherein the component [E] has a tensile elongation at break of 20% or more.

6. The prepreg according to claim 1, wherein a complex viscosity $\eta^*$ of the first resin composition at 80° C. is $3.0 \times 10^2$ to $1.5 \times 10^3$ Pa·s.

7. The prepreg according to claim 1, wherein a second resin composition
is impregnated in the carbon fiber of component [A];
comprises components [B] to [D] and optionally [E]; and
has a complex viscosity $\eta^*$ at 80° C. of 1.0 to $1.5 \times 10^1$ Pa·s.

8. The prepreg according to claim 1, wherein a fiber volume content (Vf) of the component [A] is 50 to 65% by volume.

9. The prepreg according to claim 1, wherein a prepreg test piece is obtained by cutting the prepreg in a size of 800 mm in the fiber direction and 6.35 mm in the direction perpendicular to the fiber, and the prepreg test piece exhibits a percent change in mass of 0.1% or less, when the prepreg test piece is abraded 700 mm over 5 seconds at an angle of 90 degrees with respect to an end face of a 10 mm-thick aluminum plate chamfered to C0.1 while applying a load of 1.5 kg to a longitudinal end of the prepreg test piece.

10. The prepreg according to claim 1, wherein when a cut prepreg test piece is obtained by cutting the prepreg in a size of 800 mm in the fiber direction and 6.35 mm perpendicular to the fiber direction, and the cut prepreg test piece is attached to a mirror-finished vertical plate made of SUS404 and subjected to an environment of 35° C. and 50% relative humidity, the cut prepreg test piece does not peel off from the plate after one hour.

11. A fiber-reinforced composite material obtained by heat-curing the prepreg according to claim 1, wherein the fiber-reinforced composite material has an open type (mode 1) interlaminar fracture toughness ($G_{Ic}$) of 400 J/m$^2$ or more.

12. The fiber-reinforced composite material according to claim 11, having a compression after impact (CAI) of 280 MPa or more.

13. A prepreg which comprises:
a resin layer comprising components [B] to [D] and optionally [E], wherein the resin layer is laminated on both sides of a sheet base material layer that comprises [A] a carbon fiber,
wherein optional component [E] comprises particles
having a number average primary particle size of 5 to 50 μm,
having a content ratio (% by mass) of thermoplastic resin and thermosetting resin of 95:5 to 70:30, and
generating a crack that has a size of 20 μm or less when the particle is immersed in methyl ethyl ketone and boiled and refluxed for 24 hours wherein the number of generated cracks is 5 or less,
[B] an epoxy resin having two or more glycidyl groups in one molecule,
[C] an aromatic amine compound, and
[D] a thermoplastic resin having a polyarylether skeleton, and
the prepreg satisfies the following conditions (I) to (VI) in the resin layer:
Condition (I): 80% by mass or more of the component [B] is an epoxy resin having a viscosity at 25° C. of $2.0 \times 10^4$ mPa·s or more,
Condition (II): a ratio of the number of active hydrogens in the component [C] to the number of epoxy groups in the component [B] is 0.7 to 1.3 as a molar ratio,
Condition (III): the prepreg comprises 15 to 25 parts by mass of the component [D] with respect to 100 parts by mass of the component [B],
Condition (IV): the prepreg comprises 50 to 80 parts by mass of the component [E] with respect to 100 parts by mass of the component [B],
Condition (V): a minimum value of loss tangent tanδ of a resin composition comprising the layer in a temperature range of 12 to 25° C. is 1.0 or less,
Condition (VI): a thickness of the resin layer is 7% or more of an average thickness of the prepreg,
and 85% by mass or more of the particles of component [E] is present in a region from both surfaces of the prepreg to 9% of the average thickness.

* * * * *